(12) United States Patent
Damnjanovic et al.

(10) Patent No.: US 8,861,408 B2
(45) Date of Patent: Oct. 14, 2014

(54) HYBRID AUTOMATIC REPEAT REQUEST FEEDBACK TRANSMISSION IN A MULTI COMPONENT-CARRIER COMMUNICATION SYSTEM

(75) Inventors: Jelena M. Damnjanovic, Del Mar, CA (US); Wanshi Chen, San Diego, CA (US); Xiliang Luo, Cardiff, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 13/284,786

(22) Filed: Oct. 28, 2011

(65) Prior Publication Data

US 2012/0134305 A1 May 31, 2012

Related U.S. Application Data

(60) Provisional application No. 61/409,520, filed on Nov. 2, 2010.

(51) Int. Cl.
| | |
|---|---|
| *H04J 3/00* | (2006.01) |
| *H04L 1/16* | (2006.01) |
| *H04L 5/00* | (2006.01) |
| *H04L 1/18* | (2006.01) |
| *H04W 72/12* | (2009.01) |

(52) U.S. Cl.
CPC ............. *H04L 1/1607* (2013.01); *H04L 1/1854* (2013.01); *H04L 5/0005* (2013.01); *H04L 5/001* (2013.01); *H04L 5/0053* (2013.01); *H04W 72/1284* (2013.01)
USPC .......................................... 370/280; 455/501

(58) Field of Classification Search
CPC .................................................... H04L 1/1607
USPC .................................. 370/280, 328; 455/501
See application file for complete search history.

(56) References Cited

U.S. PATENT DOCUMENTS

| | | | |
|---|---|---|---|
| 6,735,243 | B1 | 5/2004 | Akopian |
| 2010/0046460 | A1 | 2/2010 | Kwak et al. |
| 2010/0091724 | A1* | 4/2010 | Ishii et al. ..................... 370/329 |
| 2010/0098012 | A1 | 4/2010 | Bala et al. |
| 2010/0272048 | A1 | 10/2010 | Pan et al. |

(Continued)

FOREIGN PATENT DOCUMENTS

| | | |
|---|---|---|
| JP | 2007121226 A | 5/2007 |
| JP | 2012507701 A | 3/2012 |
| WO | 2010123303 A2 | 10/2010 |
| WO | 2011019795 | 2/2011 |

OTHER PUBLICATIONS

International Search Report and Written Opinion—PCT/US2011/058478—ISA/EPO—Dec. 22, 2011.

(Continued)

*Primary Examiner* — Wei Zhao
(74) *Attorney, Agent, or Firm* — Novak Druce Connolly Bove + Quigg LLP

(57) ABSTRACT

Methods, systems, devices, and computer program products are described which facilitate the transmission and reception of acknowledgment/negative acknowledgment (ACK/NACK) feedback associated with downlink data transmissions in a multi-carrier wireless communication system. Scheduling request resources may be utilized to enable the transmission of ACK/NACK feedback for the multiple component carriers when a positive scheduling request is present and the techniques described may be utilized to improve the efficiency of control channel signaling in different system configurations.

62 Claims, 10 Drawing Sheets

(56) References Cited

U.S. PATENT DOCUMENTS

2011/0194516 A1    8/2011    Aiba et al.
2011/0243066 A1*  10/2011  Nayeb Nazar et al. ....... 370/328
2012/0044871 A1*  2/2012    Li et al. ......................... 370/328

OTHER PUBLICATIONS

LG Electronics: UCI Combination on PUCCH for CAM, 3GPP Draft; R1-105649 LG Ucicombination PUCCH, 3rd Generation Partnership Project(3 GPP), Mobile Competence Centre ; 650, Route Des Lucioles ; F-06921 Sophia-Anti Polis Cedex ; France, vol. RAN WG1, No. X i 'an; 20101011, Oct. 6, 2010, XP050450757.

LG Electronics: "UCI multiplexing for LTE-A" , 3GPP Draft; R1-103729 U C I Multiplexing for LTE-A, 3rd Generation Partnershi P Project (3GPP), Mobile Competence Centre ; 650, Route Des Lucioles ; F-06921 Sophia-Anti Polis Cedex ; France, vol. RAN WG1, No. Dresden, Germany; 20100628, Jun. 22, 2010, XP050449160.

Nokia Siemens Networks et al: "Mapping table and other remaining details for Format 1b with Channel Selection", 3GPP Draft; R1-105520, 3rd Generation Partnershi P Project (3GPP), Mobile Competence Centre ; 650, Route Des Lucioles ; F-06921 Sophia-Anti Polis Cedex ; France, vol. RAN WG1, No. Xi'an; 20101011, Oct. 5, 2010, XP050450633.

ZTE: "Multiple Ackinack f o r TDD", 3GPP Draft; R1-082372, 3rd Generation Partnership Project (3GPP), Mobi LE Competence Centre ; 650, Route Des Lucioles ; F-06921 Sophia-Anti Polis Cedex ; France, vol. RAN WG1, No. Warsaw, Poland; 20080624, Jun. 24, 2008 , XP050110658.

Huawei et al., "Simultaneous transmission of SRI and ACK/NACK", 3GPP Draft; R1-105124, 3rd Generation Partnership Project (3GPP), Mobile Competence Centre; 650, Route Des Lucioles; F-06921 Sophia-Antipolis Cedex; France, vol. RAN WG1, No. Xian; 20101011, Oct. 5, 2010, pp. 1-6, XP050450346, [retrieved on Oct. 5, 2010].

European Patent Office Communication Pursuant to Article 94(3) EPC, European App. No. 11782330.2, issued on Feb. 11, 2014.

Huawei: "Simultaneous Transmission of CQI, ACK/NACK or SRI on PUCCH in Carrier Aggregation", 3GPP TSG RAN WG1 meeting#61bis, Jul. 2, 2010, R1-103887, pp. 1-8.

Taiwan Search Report—TW100140010—TIPO—May 22, 2014.

* cited by examiner

HYBRID AUTOMATIC REPEAT REQUEST FEEDBACK TRANSMISSION IN A MULTI COMPONENT-CARRIER COMMUNICATION SYSTEM

CROSS REFERENCES

The present application for patent claims priority to U.S. Provisional Patent Application No. 61/409,520 entitled "HYBRID AUTOMATIC REPEAT REQUEST FEEDBACK TRANSMISSION IN A MULTI-COMPONENT CARRIER COMMUNICATION SYSTEM" filed Nov. 2, 2010, and assigned to the assignee hereof and hereby expressly incorporated by reference herein.

BACKGROUND

The following relates generally to wireless communications, and more specifically to transmission of uplink control information in a multi-carrier communication system.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, 3GPP Long Term Evolution (LTE) systems, and orthogonal frequency-division multiple access (OFDMA) systems.

Generally, a wireless multiple-access communication system can simultaneously support communication for multiple wireless terminals. Each terminal, or user equipment (UE), communicates with one or more base stations through transmissions on forward and reverse links. The forward link (or downlink) refers to the communication link from the base stations to the user equipment, and the reverse link (or uplink) refers to the communication link from the user equipment to the base stations. This communication link may be established through a single-in-single-out, multiple-in-single-out or a multiple-in-multiple-out (MIMO) system.

In LTE systems, a physical downlink shared channel (PDSCH) carries data and signaling information to the user equipment. The user equipment can request the retransmission of the data packets that were incorrectly received according to a hybrid automatic repeat request (HARQ) process. According to the HARQ process, the user equipment only requests the retransmission of those packets that could not be corrected by the forward error correction (FEC) codes at the user equipment. In response to the reception of the data, the user equipment produces a positive acknowledgment (ACK) that is indicative of the correct reception of the data, or a negative acknowledgment (NACK), which is indicative of an incorrect reception of the data. The ACK/NACK may be transmitted to the base station (or eNodeB) on either the physical uplink control channel (PUCCH) or multiplexed with the uplink data transmissions on the physical uplink shared channel (PUSCH).

SUMMARY

The described features generally relate to one or more improved systems, methods, and/or devices for packaging and transmission of control information that includes both scheduling request and ACK/NACK feedback information in a multi-carrier wireless communications system. Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

The disclosed embodiments relate to systems, methods, devices and computer program products that facilitate the transmission of acknowledgment/negative acknowledgment (ACK/NACK) feedback with positive scheduling requests in multiple component carrier wireless communication systems. One aspect relates to a method of wireless communication that includes determining, at a user equipment, ACK/NACK feedback associated with downlink data for a plurality of component carriers. The method further comprises, upon a determination that a positive scheduling request (SR) is present, selecting one or more SR resources available to the user equipment and transmitting the ACK/NACK feedback for the plurality of component carriers using one or more of the available SR resources.

In one example, the user equipment is an LTE user equipment configured to operate using multiple component carriers that comprise frequency division duplex (FDD) carriers. The LTE user equipment determines ACK/NACK feedback for one or more codewords received on each of a first FDD component carrier and on a second FDD component carrier. The ACK/NACK feedback for the first FDD component carrier is spatially bundled to obtain a first ACK/NACK bit, and the ACK/NACK feedback for the second FDD component carrier is spatially bundled to obtain a second ACK/NACK bit. A PUCCH format 1b message is generated with the first and second ACK/NACK bits comprising the bundled ACK/NACK feedback. The bundled ACK/NACK feedback is transmitted on an identified SR resource when a positive scheduling request is present. In some examples, the effective number of ACK/NACK bits is increased and additional feedback states for one or more of the first and second component carriers, such as ACK, NACK, and/or DTX can be signaled. The additional states can be conveyed by the PUCCH format 1b message.

In another example, the user equipment is an LTE user equipment configured to operate using multiple component carriers that comprise time division duplex (TDD) carriers. The LTE user equipment of such an example may determine ACK/NACK feedback for a data transmission on a first TDD component carrier and a second TDD component carrier. A number of ACK instances may be determined for the data transmission on the first and second component carriers based on the ACK/NACK information. First and second bit values may then be determined for the ACK/NACK feedback based on a mapping of the number of ACK instances. A PUCCH format 1b message may be generated with the first and second bits comprising the bundled ACK/NACK feedback, in which the bundled ACK/NACK feedback is transmitted on an identified SR resource.

Another example provides an LTE user equipment configured to select one or more scheduling request (SR) resources available to the user equipment upon a determination that a SR is to be transmitted. The selection of one or more SR resources is based on the state of feedback information associated with multiple downlink component carriers received at the user equipment. The user equipment may be configured to use a plurality of SR resources and may select among the configured SR resources to signal additional bits of ACK/

NACK information when it is determined that a scheduling request is to be transmitted with ACK/NACK feedback in an uplink subframe.

In one example, a method of wireless communication is provided. The method includes determining, at a user equipment, acknowledgment/negative acknowledgment (ACK/NACK) feedback associated with downlink data transmission on a plurality of component carriers. The method also includes identifying one or more scheduling request (SR) resources available to the user equipment upon a determination that a positive SR is present, bundling the ACK/NACK feedback, and transmitting the bundled ACK/NACK feedback for the plurality of component carriers using the one or more selected SR resources. The bundling the ACK/NACK feedback may include determining an ACK/NACK feedback value for each component carrier; and aggregating the number of ACKs across the component carriers. The bundling the ACK/NACK feedback may also include determining an ACK/NACK feedback value for each component carrier, determining a total number of ACK instances, mapping a first number of ACKs to a first bit value associated with the one or more SR resources, and mapping a remaining number of ACKs to a second bit value associated with the one or more SR resources. The first number of ACKs may correspond to ACKs in a first subset of the plurality of component carriers, and the remaining number of ACKs may correspond to the remaining of the plurality of component carriers. The first subset of the plurality of component carriers, in an example, comprises a first component carrier, and the remaining of the plurality of component carriers comprises a second component carrier. In one example, the plurality of component carriers comprise first and second downlink component carriers, and the bundling the ACK/NACK feedback comprises: determining an ACK/NACK feedback value for each of the first and second component carriers; and mapping the ACK/NACK feedback for the first component carrier to a first bit value associated with the one or more SR resources and mapping the ACK/NACK feedback for the second component carrier to a second bit value associated with the one or more SR resources.

The one or more SR resources may radio resource control (RRC) configured. At least one secondary SR resource may shared between the user equipment and another user equipment. The selection of the one or more SR resources may comprise selecting at least one secondary SR resource in accordance with a received control information. The received control information may comprise at least one of an ACK/NACK resource indicator (ARI) and a time-division multiplexing information. Prior to the transmission of the ACK/NACK feedback, a plurality of positive acknowledgment (ACK) and/or negative acknowledgement (NACK) feedbacks may be subject to a bundling operation, which may include determining the total number of ACK instances, mapping a first number of ACKs to a first bit value associated with the one or more SR resources, and mapping a remaining number of ACKs to a second bit value associated with the one or more SR resources. The selection of SR resources, for example, may increase the effective number of bits with which to convey the ACK/NACK feedback when the UE makes an SR request. The ACK/NACK feedback may transmitted on a physical uplink control channel (PUCCH) of a long term evolution (LTE) wireless communication system that is configured to operate using uplink control information Format 1b.

In another example, a wireless communications apparatus includes means for determining, at a user equipment, acknowledgment/negative acknowledgment (ACK/NACK) feedback associated with downlink data for a plurality of component carriers. The apparatus also includes means for identifying one or more scheduling request (SR) resources available to the user equipment upon a determination that a positive SR is present, means for bundling the ACK/NACK feedback, and means for transmitting the bundled ACK/NACK feedback for the plurality of component carriers using the one or more selected SR resources. The means for bundling the ACK/NACK feedback may include means for determining an ACK/NACK feedback value for each component carrier and means for aggregating the number of ACKs across the component carriers. The means for bundling the ACK/NACK feedback may also include means for determining an ACK/NACK feedback value for each component carrier, means for determining the total number of ACK instances, and means for mapping a first number of ACKs to a first bit value associated with the one or more SR resources and mapping remaining number of ACKs to a second bit value associated with the one or more SR resources. The first number of ACKs may correspond to ACKs in a first subset of the plurality of component carriers, and the remaining number of ACKs may correspond to the remaining of the plurality of component carriers. The plurality of component carriers may include first and second downlink component carriers. The means for bundling the ACK/NACK feedback may include means for determining an ACK/NACK feedback value for each of the first and second component carriers, and means for mapping the ACK/NACK feedback for the first component carrier to a first bit value associated with the one or more SR resources and mapping the ACK/NACK feedback for the second component carrier to a second bit value associated with the one or more SR resources.

The means for bundling the ACK/NACK feedback may include means for determining an ACK/NACK feedback value for each component carrier, and means for spatially bundling ACK/NACK feedback for two or more subframes of one or more of the component carriers. The means for bundling the ACK/NACK feedback may also include means for determining the total number of ACK instances, and means for mapping a first number of ACKs to a first bit value associated with the one or more SR resources and mapping remaining number of ACKs to a second bit value associated with the one or more SR resources.

In another example, a wireless communication apparatus includes an acknowledgment/negative acknowledgment (ACK/NACK) feedback module configured to determine ACK/NACK feedback associated with downlink data for a plurality of component carriers. The apparatus also includes a scheduling request (SR) module configured to select one or more SR resources upon a determination that a positive SR is present, a bundling module configured to bundle the ACK/NACK feedback, and a transmitter module configured to transmit the bundled ACK/NACK feedback for the plurality of component carriers using the one or more selected SR resources. The one or more SR resources may comprise a primary SR resource and one or more secondary SR resources. The one or more secondary SR resources may be radio resource control (RRC) configured. At least one secondary SR resource may be shared between the user equipment and another user equipment. The SR module is further configured, in some examples, to select at least one secondary SR resource in accordance with a received control information. The control information may be received as part of a transmit power control (TPC) field on a physical downlink control channel (PDCCH) of a secondary component carrier. The bundling module may be further configured to determine the total number of ACK instances, and map a first number of ACKs to a first bit value associated with the one or more SR resources and map remaining number of ACKs to a second bit value associated with the one or more SR resources.

A computer program product for wireless communication may comprise a non-transitory computer readable medium that includes code for determining acknowledgment/negative acknowledgment (ACK/NACK) feedback associated with downlink data for a plurality of component carriers; code for selecting one or more available scheduling request (SR) resources upon a determination that a positive SR is present, code for bundling the ACK/NACK feedback, and code for transmitting the bundled ACK/NACK feedback for the plurality of component carriers using the one or more selected SR resources. The code for bundling the ACK/NACK feedback may include code for determining an ACK/NACK feedback value for each component carrier, and code for aggregating the number of ACKs across the component carriers. The code for bundling the ACK/NACK feedback may include code for determining an ACK/NACK feedback value for each component carrier, code for determining the total number of ACK instances, and code for mapping a first number of ACKs to a first bit value associated with the one or more SR resources and mapping remaining number of ACKs to a second bit value associated with the one or more SR resources. The first number of ACKs may correspond to ACKs in a first subset of the plurality of component carriers, and the remaining number of ACKs may correspond to the remaining of the plurality of component carriers. The plurality of component carriers may include first and second downlink component carriers, and the code for bundling the ACK/NACK feedback may include code for determining an ACK/NACK feedback value for each of the first and second component carriers, and code for mapping the ACK/NACK feedback for the first component carrier to a first bit value associated with the one or more SR resources and mapping the ACK/NACK feedback for the second component carrier to a second bit value associated with the one or more SR resources. The code for bundling the HARQ feedback may include code for determining an ACK/NACK feedback value for each component carrier, and code for spatially bundling ACK/NACK feedback for two or more subframes of one or more of the component carriers. The code for bundling the ACK/NACK feedback may include code for determining the total number of ACK instances, and code for mapping a first number of ACKs to a first bit value associated with the one or more SR resources and mapping remaining number of ACKs to a second bit value associated with the one or more SR resources.

In another example, a method of wireless communication includes allocating one or more scheduling request (SR) resources to a user equipment configured to operate in a wireless communication system with a plurality of component carriers, receiving ACK/NACK feedback on the one or more SR resources allocated to the user equipment, and determining the user equipment retransmission requests for downlink data on the plurality of component carriers in accordance with the received ACK/NACK feedback. The user equipment retransmission requests may include mapping information received on the one or more SR resources to positive acknowledgment (ACK) and/or negative acknowledgement (NACK) feedbacks associated with downlink data of the user equipment. Determining the user equipment retransmission requests may include mapping a first bit value associated with the one or more SR resources to a first number of ACKs on a first subset of the plurality of component carriers, determining the user equipment retransmission requests for downlink data on the first subset of the plurality of component carriers in accordance with the first number of ACKs, mapping a second bit value associated with the one or more SR resources to a second number of ACKs on a second subset of the plurality of component carriers, and determining the user equipment retransmission requests for downlink data on the second subset of the plurality of component carriers in accordance with the second number of ACKs. The first number of ACKs may correspond to ACKs on a first component carrier, and the second number of ACKs may correspond to ACKS on a second component carrier. The SR resources may be shared between two or more user equipment.

A wireless communications apparatus of another example includes means for allocating one or more scheduling request (SR) resources to a user equipment configured to operate in a wireless communication system with a plurality of component carriers, means for receiving acknowledgment/negative acknowledgement (ACK/NACK) feedback on the one or more SR resources allocated to the user equipment, and means for determining the user equipment retransmission requests for downlink data on the plurality of component carriers in accordance with the received ACK/NACK feedback. The means for determining the user equipment retransmission requests may include means for mapping information received on the one or more SR resources to positive acknowledgment (ACK) and/or negative acknowledgement (NACK) feedbacks associated with downlink data of the user equipment. The means for determining the user equipment retransmission requests may include means for mapping a first bit value associated with the one or more SR resources to a first number of ACKs on a first subset of the plurality of component carriers, means for determining the user equipment retransmission requests for downlink data on the first subset of the plurality of component carriers in accordance with the first number of ACKs, means for mapping a second bit value associated with the one or more SR resources to a second number of ACKs on a second subset of the plurality of component carriers, and means for determining the user equipment retransmission requests for downlink data on the second subset of the plurality of component carriers in accordance with the second number of ACKs. The first number of ACKs may correspond to ACKs on a first component carrier, and the second number of ACKs may correspond to ACKS on a second component carrier.

A computer program product for wireless communication of an example includes a non-transitory computer readable medium including code for allocating one or more scheduling request (SR) resources to a user equipment configured to operate in a wireless communication system with a plurality of component carriers, code for receiving acknowledgment/negative acknowledgement (ACK/NACK) feedback on the one or more SR resources allocated to the user equipment, and code for determining the user equipment retransmission requests for downlink data on the plurality of component carriers in accordance with the received ACK/NACK feedback. The code for determining the user equipment retransmission requests may include code for mapping information received on the one or more SR resources to positive acknowledgment (ACK) and/or negative acknowledgement (NACK) feedbacks associated with downlink data of the user equipment. The code for determining the user equipment retransmission requests may include code for mapping a first bit value associated with the one or more SR resources to a first number of ACKs on a first subset of the plurality of component carriers, code for determining the user equipment retransmission requests for downlink data on the first subset of the plurality of component carriers in accordance with the first number of ACKs, code for mapping a second bit value associated with the one or more SR resources to a second number of ACKs on a second subset of the plurality of component carriers, and code for determining the user equipment retransmission requests for downlink data on the second subset of the plurality of component carriers in accordance with the second number of ACKs. The first number of ACKs may correspond to ACKs on a first component carrier, and the second number of ACKs may correspond to ACKS on a second component carrier.

A wireless communication apparatus of another example includes a scheduling request (SR) module configured to allocate one or more SR resources to a user equipment configured to operate in a wireless communication system with a plurality of component carriers, and an acknowledgment/negative acknowledgement (ACK/NACK) feedback module configured to receive ACK/NACK feedback on the one or more SR resources allocated to the user equipment, and determine the user equipment retransmission requests for downlink data on the plurality of component carriers in accordance with the received ACK/NACK feedback. The ACK/NACK feedback module may be further configured to map information received on the one or more SR resources to positive acknowledgment (ACK) and/or negative acknowledgement (NACK) feedbacks associated with downlink data of the user equipment. The ACK/NACK feedback module may also be configured to map a first bit value associated with the one or more SR resources to a first number of ACKs on a first subset of the plurality of component carriers, determine the user equipment retransmission requests for downlink data on the first subset of the plurality of component carriers in accordance with the first number of ACKs, map a second bit value associated with the one or more SR resources to a second number of ACKs on a second subset of the plurality of component carriers, and determine the user equipment retransmission requests for downlink data on the second subset of the plurality of component carriers in accordance with the second number of ACKs. The first number of ACKs may correspond to ACKs on a first component carrier, and the second number of ACKs may correspond to ACKS on a second component carrier.

These and other features of various embodiments, together with the organization and manner of operation thereof, will become apparent from the following detailed description when taken in conjunction with the accompanying drawings, in which like reference numerals are used to refer to like parts throughout.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Various disclosed embodiments are illustrated by way of example, and not of limitation, by referring to the accompanying drawings, in which.

DETAILED DESCRIPTION OF THE INVENTION

Systems, methods, devices and computer program products are described that facilitate the transmission of control information that includes scheduling request information and hybrid automatic repeat request (HARQ) feedback in multiple component carrier wireless communication systems. In some examples, a user equipment (UE) determines acknowledgment/negative acknowledgment (ACK/NACK) feedback associated with downlink data for a set of component carriers. Upon a determination that a positive scheduling request (SR) is present, the UE selects one or more available SR resources, and transmits the ACK/NACK feedback for the set of component carriers using one or more of the available SR resources.

The ACK/NACK feedback may be bundled according to one or more bundling schemes. ACK/NACK bundling schemes may include bundling ACK/NACKs across two or more downlink CCs, bundling ACK/NACKs from a plurality of codewords within a single downlink CC, and/or bundling ACK/NACKs for two or more subframes in a time division duplex (TDD) CC into a single ACK/NACK. The bundled ACK/NACK feedback may include a first number of ACKs that are mapped to a first bit value associated with the one or more SR resources and a second number of ACKs that are mapped to a second bit value associated with the one or more SR resources. The first number of ACKs may be associated with one or more downlink component carriers, and the second number of ACKs may be associated with one or more different downlink component carriers.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
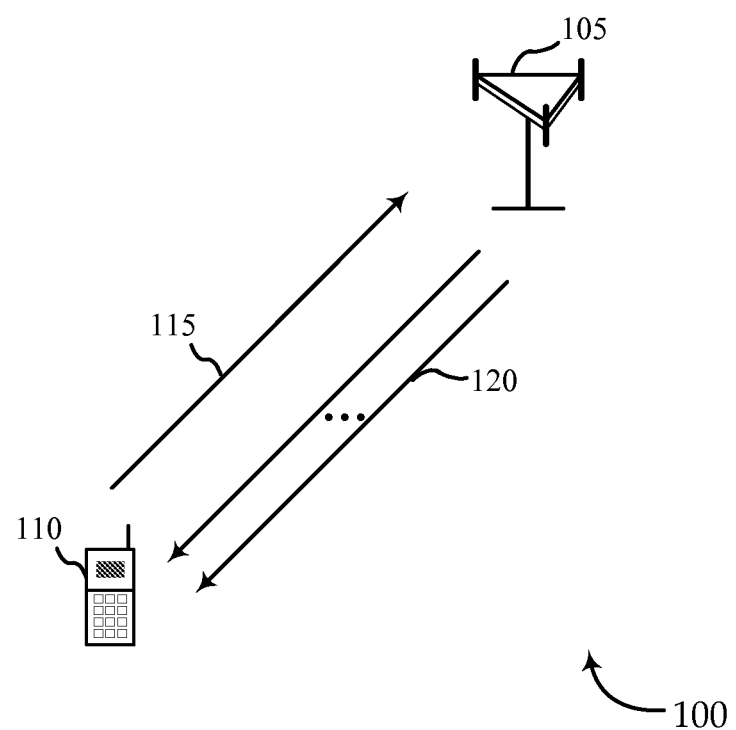
FIG. 1 illustrates a multi-carrier wireless communication system.

Referring first to FIG. 1, a block diagram illustrates an example of a wireless communication system 100 within which the various disclosed examples may be implemented. The system 100 includes a base station 105 and a user equipment 110. Of course, such a system typically includes a number of base stations 105 and user equipment 110, with a single base station 105 and user equipment 110 illustrated in FIG. 1 for purposes of simplifying the discussion of the system. Base station 105 may be a macrocell, femtocell, picocell, and/or similar base station, a mobile base station, or relay node, for example. The system 100 supports operation on multiple component carriers (CCs), each of which include waveform signals of different frequencies. In FIG. 1, multiple downlink CCs 120 carry downlink transmissions from the base station 105 to the user equipment 110. User equipment 110 generates feedback (e.g., an acknowledgment or negative acknowledgement of receipt of downlink transmissions on the downlink CCs 120. User equipment 110 bundles and transmits the feedback to the base station 105 on uplink CC (or uplink CCs) 115. The system 100 may be a multi-carrier LTE network capable of efficiently allocating network resources.

The base station 105 may wirelessly communicate with the user equipment 110 via one or more base station antenna(s). The base station 105 is configured to communicate with the user equipment 110 under the control of a base station controller via multiple downlink and/or uplink CCs. The base station 105 may be a node B, or an enhanced node B (eNodeB). The base station 105 may provide communication coverage for a particular geographic area, with other base stations 105 that may provide coverage for different geographic areas. A plurality of user equipments 110 may be dispersed throughout the coverage area. The user equipment 110 may be, for example, a mobile station, mobile device, access terminal (AT), or subscriber unit. Such a user equipment 110 may include a cellular phone and wireless communications device, but may also be a personal digital assistant (PDA), smartphone, other handheld device, netbook, notebook computer, tablet computer, etc.

In LTE systems, data and signaling information are transmitted to the user equipment 110 through the downlink CCs 120, and the user equipment 110 may transmit a positive acknowledgment (ACK) that is indicative of the correct reception of the data, or a negative acknowledgment (NACK), which is indicative of an incorrect reception of the data, to base station 105 on uplink CC (or uplink CCs) 115. The user equipment 110 may transmit ACK/NACK feedback to the base station 105 on either the physical uplink control channel (PUCCH) or multiplexed with the uplink data transmissions on the physical uplink shared channel (PUSCH). The PUCCH, in some systems, is also used to carry scheduling requests (SRs) that are transmitted by the user equipment 110 to the base station 105 to request resources for uplink transmissions. The SR transmissions may be carried out using any suitable transmission scheme based on which, for a positive SR, a modulated data symbol is transmitted on PUCCH, while for a negative SR (i.e., when no request for scheduling is needed), nothing is transmitted. If an SR and ACK/NACK are to be transmitted in the same uplink subframe, in systems that are configured to operate using frequency division duplex (FDD), the ACK/NACK feedback may be transmitted using the assigned PUCCH SR resources for a positive SR, and, for a negative SR, the ACK/NACK is transmitted on the assigned PUCCH ACK/NACK resources. In systems, that use multiple CCs, depending on the number of CCs and the particular mode of operation (e.g., FDD versus time division duplex (TDD)), a large number of ACK/NACKs can potentially be generated.

In some examples, the base station 105 configures a multi-carrier user equipment 110 to use different techniques to signal control information in an uplink subframe. These techniques may include identifying resources for indicating a positive scheduling request and for providing ACK/NACK feedback for multiple downlink CCs 120 and may be based on the number the downlink CCs 120, the number of SR resources assigned to the user equipment 110, whether the user equipment 110 is configured for FDD or TDD, or a combination thereof as will be described in more detail below. Schemes to be used on an uplink CC 115 may include combinations of techniques for indicating a positive scheduling request and for providing ACK/NACK feedback for multiple downlink CCs 120 and an order in which these techniques are applied. For example, bundling techniques may include CC bundling in combination with spatial bundling and/or mapping of ACK/NACK feedback for particular CCs into one or more bits that are transmitted using a SR resource.

Uplink subframes may be generated, according to various examples, that include both SR and ACK/NACK in accordance with a user equipment configuration for communicating with a base station. For example, a user equipment 110 may be configured with one SR resource and, when a positive SR is present, it may transmit both SR and ACK/NACK feedback for multiple carriers in a same subframe using the SR resource, where the manner in which the ACK/NACK feedback is provided depends upon whether the user equipment 110 is operating using FDD or TDD. In other cases, additional information may be transmitted using SR channel selection with PUCCH format 1b via additional RRC configuration.

A user equipment 110 may be configured by the base station 105 to operate using two (or more) downlink CCs 120. A control channel of the uplink CC 115 (e.g., PUCCH) can carry ACK/NACK and SR information, and the base station 105 may configure the user equipment 110 with occasions for sending scheduling requests on the uplink CC 115 at specific subframe intervals. The user equipment 110 may make a determination that data is to be sent on one or more uplink CCs 115 and that there is not a current uplink grant (e.g., PUSCH grant) for transmitting the data, and thus the user equipment 110 determines a SR is to be transmitted.

The user equipment 110 can identify resources available on the uplink CC 115, and transmit both ACK/NACK feedback and the SR in a same subframe on the uplink CC 115. In some examples, if the user equipment 110 is operating using FDD, feedback information for two downlink subframes may comprise four ACK/NACK bits (i.e., two codewords per subframe on two downlink CCs). This information can be transmitted using the assigned SR resource through, for example, spatial bundling of the ACK/NACK feedback for each CC (per-CC spatial bundling). In examples where the user equipment 110 is operating using TDD, ACK/NACK feedback information may be transmitted according to a cumulative count of ACKs for each CC. In some examples, such as when a user equipment 110 is configured according to PUCCH format 1b in a LTE system, each bit of a two-bit SR resource may be mapped to provide information related to different CCs, or different groups of CCs. In other examples, ACK/NACK feedback information may also be conveyed through SR channel selection, where the selection of a particular SR channel is used to convey information.

Using uplink control information according to such examples, may provide enhanced communications and efficient use of resources. In one aspect, the present disclosure facilitates use of existing formats for transmitting uplink control information in a multi-carrier system. As described herein, for LTE systems, PUCCH format 1b may used to convey ACK/NACK feedback for multiple carriers in addition to making a scheduling request in a same subframe thereby avoiding a requirement to use relaxed waveforms such as DFT-S-OFDM in some situations. Furthermore, techniques such as described herein may provide enhanced ACK/NACK/DTX granularity for multi-carrier operation, allowing systems to distinguish additional states (e.g., DTX is different from NACK) in multi-carrier operation using SR channel selection. Additionally, depending upon whether a system is a FDD or TDD system, bundling of ACK/NACK feedback may be optimized for two downlink component carriers, such as through the use of per-cell spatial bundling with carrier aggregation in FDD systems and CC-bundling with mapping for carrier aggregation in TDD systems.

Figure 2:
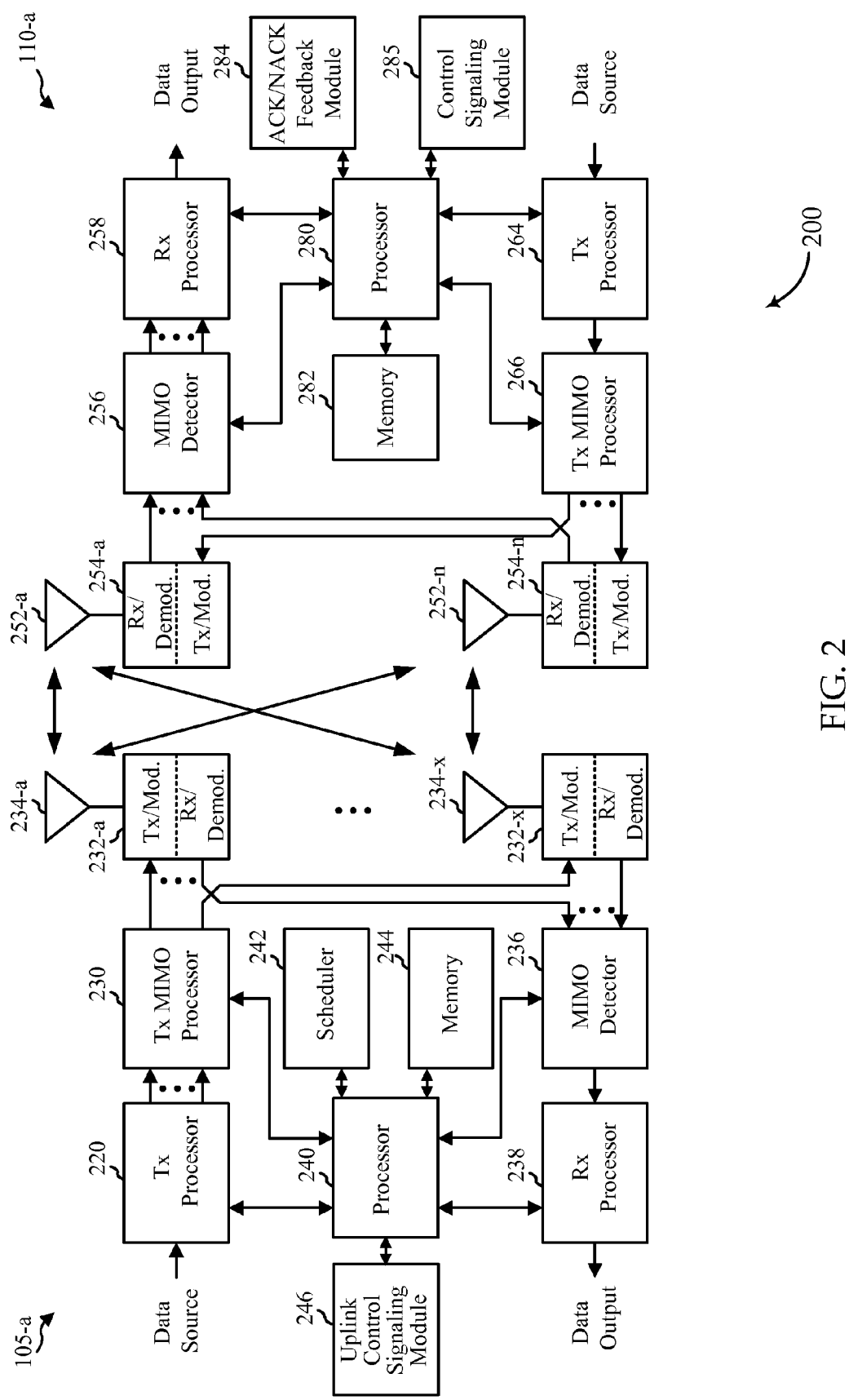
FIG. 2 is a block diagram of a transmitter and receiver in the multi-carrier wireless communications system of FIG. 1.

FIG. 2 is a block diagram of a system 200 including a base station 105-a and a user equipment 110-a. This system 200 may be the system 100 of FIG. 1. The base station 105-a may be equipped with antennas 234-a through 234-x, and the user equipment 110-a may be equipped with antennas 252-a through 252-n. At the base station 105-a, a transmit processor 220 may receive data from a data source and feedback information from a processor 240, scheduler 242, memory 244, and/or uplink control signaling module 246. Uplink control signaling module 246 may process ACK/NACK feedback for one or more CCs, scheduling requests (SR), request for channel quality information (CQI) such as channel state information (CSI), precoding matrix indicators (PMI), rank indicators (RI), etc. which may be conveyed to the user equipment 110-a on a downlink control channel and responses to which may be received from the user equipment 110-a on an uplink control channel.

In one aspect, base station 105-a configures user equipment 110-a with respect to the control channel resources it may use to request access to the uplink shared channel. For example, base station 105-a may configure user equipment 110-a via RRC signaling to send scheduling requests at predetermined SR occasions. The user equipment 110-a may send a scheduling request to access the uplink shared channel when it has not otherwise been assigned uplink resources by base station 105-a. As described herein, the particular resources and manner in which the multi-carrier user equipment 110-a reports a positive or negative scheduling request may differ depending upon whether the CCs are FDD or TDD carriers, the number of configured CCs, and the uplink resources assigned to the user equipment 110-a. User equipment 110-a may also use one or more scheduling request (SR) resources to transmit ACK/NACK information, according to an identified feedback bundling scheme that the user equipment 110-a is operating under. Control signaling module 246 in some examples configures user equipment 110-a to use different feedback bundling schemes. Uplink control signaling module 246 may configure uplink resources for the user equipment 110-a based, in part, on configured, activated, and/or scheduled CCs associated with the user equipment 110-a at any given time. For example, uplink control signaling module 246 may assign one or more SR resources for to the user equipment 110-a and may configure the user equipment 110-a to use channel selection of the multiple SR resources to report ACK/NACK feedback when a positive SR determination is made. In this way, a user equipment 110-a may utilize a UCI format, such as PUCCH format 1b, to convey ACK/NACK feedback for multiple CCs as well as the result of an SR determination.

Transmit processor 220 may also receive control information from processor 240, scheduler 242, memory 244, and/or feedback scheme module 246. The scheduler 242 may schedule the user equipment 110-a on a subset of configured carriers. The control information may identify the downlink CC mode, schedule feedback transmissions on uplink carriers, and identify the bundling scheme to be used for a particular user equipment 110-a. The transmit processor 220 may process (e.g., encode and symbol map) the data, feedback information, and control information to obtain data symbols and control symbols, respectively. The transmit processor 220 may also generate reference symbols, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the transmit modulators 232-a through 232-x. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232-a through 232-x may be transmitted via the antennas 234-a through 234-x, respectively.

At the user equipment 110-a, the antennas 252-a through 252-n may receive the downlink signals from the base station 105-a and may provide the received signals to the demodulators 254-a through 254-n, respectively. In systems that use multiple component carriers, the downlink signals may include multiple component carriers that may each include signaling and communications data. Each demodulator 254 may condition (e.g., filter, amplify, downconvert, and digitize) a respective received signal to obtain input samples. Each demodulator 254 may further process the input samples (e.g., for OFDM, etc.) to obtain received symbols for each received component carrier. A MIMO detector 256 may obtain received symbols from all the demodulators 254-a through 254-n, perform MIMO detection on the received symbols if applicable, and provide detected symbols. A receive processor 258 may process (e.g., demodulate, deinterleave, and decode) the detected symbols, providing decoded data for the user equipment 110-a to a data output, and provide decoded control information to a processor 280, memory 282, or ACK/NACK feedback module 284. Receive processor 258 also may perform forward error correction (FEC) on the decoded data to correct bit errors that may be present in the decoded data. In the event that FEC is not able to correct errors in the data (as indicated by, for example, parity bits, checksums, CRCs, etc.) associated with a particular subframe, an indication may be provided to ACK/NACK feedback module 284.

ACK/NACK feedback module 284 receives information regarding the received data and any data that is not correctly received. The ACK/NACK feedback module 284 may perform processing to identify downlink carriers, downlink transmission modes, and a feedback bundling scheme. For each received subframe of each received component carrier, the ACK/NACK feedback module 284 generates and ACK to indicate proper reception of data in the subframe, and a NACK to indicate improper reception of data in the subframe. Control signaling module 285 may perform operations to be used for confirming receipt of downlink transmissions by the user equipment 105-a according to ACK/NACK feedback transmission on the uplink CC(s). In one aspect, control signaling module 285 makes a determination regarding whether user equipment 110-a has received an uplink grant. If the user equipment 110-a has not received an uplink grant, the control signaling module 285 may determine an assigned SR resource or resources based on the RRC configuration and may transmit SR and ACK/NACK feedback in the same subframe using the determined SR resources. ACK/NACK feedback module 284, in some examples, bundles ACK/NACK feedback according to the bundling scheme identified by control signaling module 246.

On the uplink, at the user equipment 110-*a*, a transmit processor 264 may receive and process data (e.g., codewords for use in HARQ feedback) from a data source and control information (e.g., the feedback bundling scheme) from the processor 280 and control signaling module 285. The transmit processor 264 may also generate reference symbols for a reference signal. The symbols from the transmit processor 264 may be precoded by a TX MIMO processor 266 if applicable, further processed by the demodulators 254-*a* through 254-*n* (e.g., for SC-FDMA, etc.), and be transmitted to the base station 105-*a*. At the base station 105-*a*, the uplink signals from the user equipment 110-*a* may be received by the antennas 234, processed by the demodulators 232, detected by a MIMO detector 236 if applicable, and further processed by a receive processor 238 to obtain decoded data and control information sent by the mobile device 110-*a*. The processor 238 may provide the decoded data to a data output and the decoded control information to the processor 240 and/or control signaling module 246.

As noted earlier, in response to receiving data on one or more downlink CCs, and as part of the hybrid automatic repeat request (HARQ) process, the user equipment may transmit a positive acknowledgment (ACK) or a negative acknowledgment (NACK) for each received subframe. Additionally, the user equipment may transmit a scheduling request (SR) to the base station to request radio resources for future uplink transmissions. In scenarios where both ACK/NACK and SR are to be transmitted on PUCCH (e.g., when the user equipment has not been assigned an uplink resource for UL-SCH transmission), the particular resources that are used for ACK/NACK and/or SR transmissions depend on the presence of a positive or a negative SR. In particular, in systems that utilize frequency division duplex (FDD), when both ACK/NACK and SR are transmitted in the same subframe, the user equipment transmits the ACK/NACK on its assigned ACK/NACK PUCCH resource for a negative SR transmission, and transmit the ACK/NACK on its assigned SR PUCCH resource for a positive SR transmission. It should be noted that the term "resource" and, particularly "SR resources," can refer to resources in the form of time, frequency and/or particular sequences that can be used for the transmission and/or reception of information.

In TDD systems, the generation and mapping of ACK/NACKs to uplink resources may be more complex. More specifically, since the number of uplink and downlink resources in each radio frame are asymmetrically allocated based on the particular TDD configuration mode, ACK/NACK feedbacks for multiple downlink subframes may be combined to reduce the number of bits that are transmitted to the base station on a particular uplink subframe. The term time-domain bundling is therefore sometimes used to refer to combining or bundling the ACK/NACKs of such TDD subframes.

In various systems that employ multiple component carriers, such as LTE-A systems, when a positive SR is present, the number of ACK/NACKs in uplink communications can become significant due to downlink transmissions on multiple component carriers (CCs). Aggregation of the multiple component carriers in such systems may increase the overall system bandwidth. For example, two 10 MHz component carriers and four 20 MHz component carriers may be aggregated to extend the bandwidth of an LTE system to 100 MHz. Such component carriers may span a contiguous portion of the spectrum or reside on non-contiguous portions of the spectrum. In some situations, downlink data transmission on multiple CCs may result in a relatively large amount of ACK/NACK feedback and user equipment 110-*a* may have limited uplink resources with which to provide the ACK/NACK feedback to base station 105-*a*. In such cases, bundling of the ACK/NACK information may be performed to reduce the number of bits and/or the effective number of bits may be increased by using additional SR resources. For example, SR channel selection may be used to increase the effective number of bits which may accommodate feedback for additional carriers and/or increase the granularity of the feedback provided.

Figure 3:
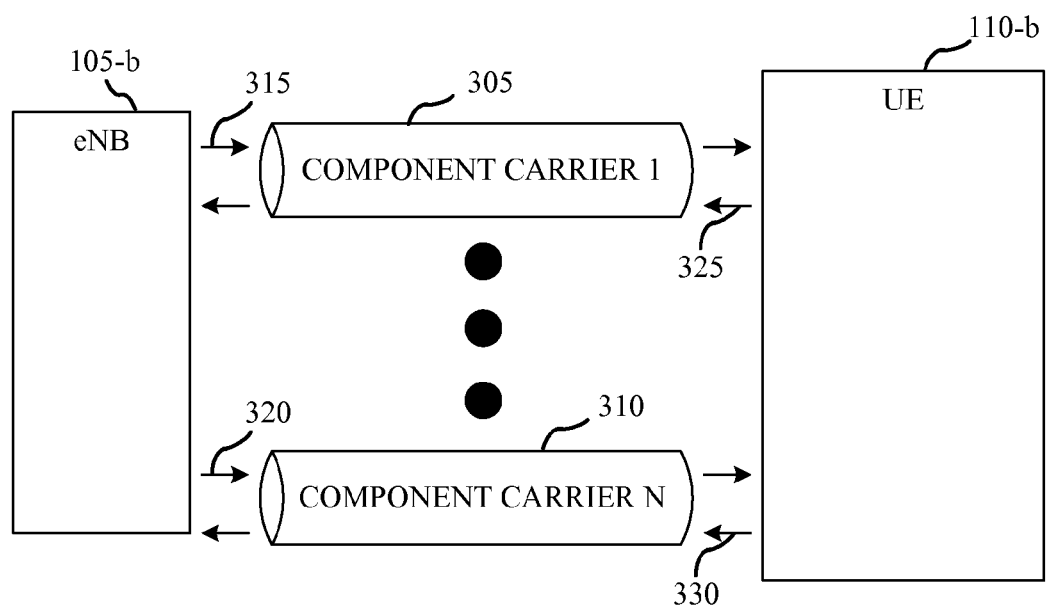
FIG. 3 shows additional aspects of a multi-carrier wireless communication system.

FIG. 3 illustrates a system 300 that is configured to operate using multiple component carriers. The system 300 can include a user equipment 110-*b*, which may communicate with an evolved Node B (eNB) 105-*b* (e.g., a base station, access point, etc.). While only one user equipment 110-*b* and one eNB 105-*b* are illustrated in FIG. 3, it is to be appreciated that the system 300 can include any number of user equipment 110-*b* and/or eNBs 105-*b*. The user equipment 110-*b* may be configured with multiple component carriers utilized by the eNodeB 105-*b* to enable a wider overall transmission bandwidth. As illustrated in FIG. 3, the user equipment 110-*b* may be configured with "component carrier 1" 305 through "component carrier N" 310, where N is an integer greater than or equal to one. While FIG. 3 depicts two or more component carriers, it is to be appreciated that the user equipment 110-*b* may be configured with any suitable number of component carriers and, accordingly, the subject matter disclosed herein and claimed is not limited to two component carriers. In one example, some of the multiple component carriers 305 through 310 may be LTE Rel-8 carriers. Thus, some of the component carriers 305 through 310 may appear as an LTE carrier to a legacy (e.g., an LTE Rel-8 based) user equipment. Each component carrier 305 through 310 may include respective downlinks 315 and 320 as well as respective uplinks 325 and 330.

In some multi-component carrier systems a user equipment may be configured with only one primary component carrier (PCC) and one or more secondary component carriers (SCCs). In such systems, the transmission of ACK/NACKs for the multiplicity of component carriers can be carried out on one uplink component carrier, namely the uplink of the PCC. As a result, the ACK/NACK feedback overhead on the corresponding PUCCH may be significantly larger than that of prior systems with one component carrier. In various examples herein, uplink transmission of combined SR and ACK/NACKs is facilitated for systems that are configured for channel selection using formats, such as Format 1b, in which a limited number of bits (e.g., two bits) are allocated for the transmission of combined SR and ACK/NACKs.

In some embodiments, the number of ACK/NACKs is reduced by first performing a spatial bundling across all spatial channels. For example, if two spatial layers are present, spatial bundling produces an ACK for a subframe only if the corresponding subframes in both layers comprise an ACK. Once spatial bundling is conducted, the ACKs across all component carriers can be added together to obtain an accumulated ACK count. The accumulated count may then be mapped to the bits that are available for accommodating the transmission of ACK/NACK in a positive SR resource. In one example, mapping of bits available in a positive SR resource may be used to convey the number of ACKs. In one example, the mapping of Table 1 may be used for conveying the bundled ACK/NACKs. For instance, an accumulated ACK count of 5 is mapped to the bit sequence [(b(0), b(1)]=(1,0), whereas an accumulated ACK count of 9 is mapped to the bit sequence [(b(0), b(1)]=(1,1).

TABLE 1

Exemplary Accumulated ACK Count Mapping

| Accumulated ACK Count | b(0), b(1) |
|---|---|
| 0 | 0, 0 |
| 1 | 0, 1 |
| 2 | 1, 0 |
| 3 | 1, 1 |
| 4 | 0, 1 |
| 5 | 1, 0 |
| 6 | 1, 1 |
| 7 | 0, 1 |
| 8 | 1, 0 |
| 9 | 1, 1 |

It should be noted that, for simplicity, Table 1 only illustrates mappings of up to 9 accumulated ACK counts. However, it is understood that additional listings may be readily included to provide a mapping for higher ACK counts in a similar fashion. Moreover, while Table 1 illustrates the mapping of ACK counts to the sequence [(b(0), b(1)] in a particular order, the mapping can be readily performed in a different sequential order.

Other embodiments may utilize different or additional methods for combining ACK/NACK feedbacks to improve the identification of the corresponding component carriers and/or subframes. In some examples, described in more detail below, various combining techniques provide enhanced identification/mapping of ACK/NACKs for a low number of component carriers (e.g., 2 component carriers) or for a larger number of aggregated component carriers. In various examples that follow, certain processing operations will be described with reference to PUCCH Format 1b that uses two bits to accommodate the transmission of ACK/NACKs for a positive SR. However, it is understood that the disclosed embodiments can be readily extended to other scenarios where a large number of ACK/NACK feedbacks must be mapped to, and transmitted, using a small number of allocated resources.

Figure 4:
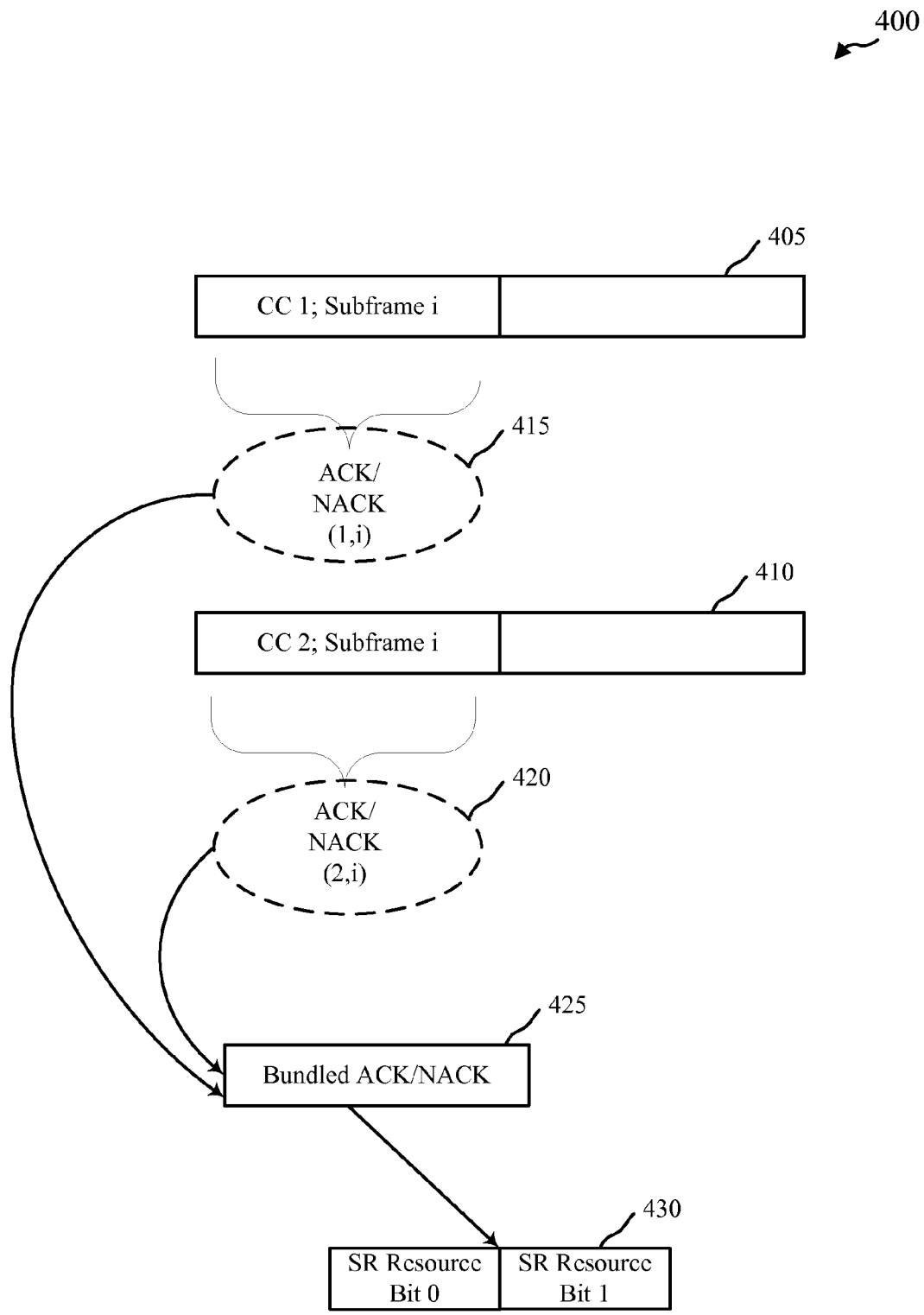
FIG. 4 shows a wireless communication system in which a scheduling request (SR) and ACK/NACK feedback for multiple CCs are transmitted in an uplink subframe.

To facilitate the understanding of the underlying concepts, an exemplary system 400 is illustrated in FIG. 4, with two component carriers, CC1 405 and CC2 410. Each CC 405, 410, includes a number of subframes including a subframe, i, illustrated for each CC 405, 410. When downlink each CC 405, 410 is received at a user equipment, the user equipment determines if the information in the subframes can be properly decoded. If so, an ACK feedback is generated. If data from a subframe is not able to be decoded after using forward error correction (FEC), a NACK feedback is generated. The ACK/NACK for subframe i on each CC 405, 410 is illustrated in FIG. 4 as ACK/NACK (1, i) 415 and ACK/NACK (2, i) 420. The ACK/NACKs 415, 420 are bundled to form bundled ACK/NACK 425 and included into SR resource 430 for transmission on an uplink carrier.

ACK/NACKs 415, 420 may be bundled according to one or more processes. In one example, the ACK/NACKs 415, 420 are bundled according to a logical AND operation. In other examples, the bundled ACK/NACK 425 includes a cumulative count of the number of ACKs present across all of the CCs. In other examples, multiple bits available in one or more selected SR resources 430 may be used to convey bundled ACK/NACK information. In one system, PUCCH Format 1b (i.e., two bits) is used to convey the combined SR and bundled ACK/NACK 425. According to one embodiment, in an FDD mode of operation, spatial bundling is carried out over each component carrier 405, 410. In such a case, for a given component carrier, the ACK/NACKs across all spatial layers are bundled to produce a single ACK/NACK value for each component carrier. The results can then be conveyed using two bits that are available in Format 1b. Table 2 shows an exemplary mapping of the ACK/NACK to SR resource bits b(0) and b(1).

TABLE 2

Example of Mapping of ACK/NACK in FDD

| Component Carrier 1 Bundled ACK/NACK | Component Carrier 2 Bundled ACK/NACK | b(0), b(1) |
|---|---|---|
| ACK | ACK | 1, 1 |
| ACK | NACK | 1, 0 |
| NACK | ACK | 0, 1 |
| NACK | NACK | 0, 0 |

The mapping of Table 2 illustrates that each component carrier 405, 410 may be readily identified for all ACK/NACK combinations. The above noted technique, therefore, provides additional information over conducting a simple count of ACKs over all component carriers, which would have produced the same count of "1" (and therefore the same bit pattern) for the ACK, NACK and NACK/ACK scenarios. It should be noted that in Table 2, each NACK entry may also correspond to a discontinuous transmission (DTX) scenario, where the ACK/NACKs are missing altogether due to, for example, a failure of the downlink resource allocation grant that is transmitted to the user equipment.

When more than two component carriers are used in a system that operates in FDD mode, ACK/NACKs can be similarly bundled over each component carrier. For example, and ACK/NACK may be generated for each codeword, and spatial bundling may be performed on the ACK/NACKs for each FDD carrier. SR resources may be identified for transmission of the ACK/NACK feedback, and a PUCCH format 1b message may be generated which includes the SR and ACK/NACK feedback. In some examples, further cross-component-carrier bundling may be provided to enable the transmission of the ACK/NACK feedbacks using the two Format 1b bits. For example, in a configuration that uses four component carriers, spatial bundling for each component carrier may be followed by pair-wise bundling across component carriers to arrive at a same number of entries as in Table 2.

In a TDD mode of operation, in addition to having to account for ACK/NACKs associated with different component carriers, ACK/NACKs in time domain (i.e., associated with different subframes) may be considered, as well. In one example, a TDD system employs spatial bundling that is first carried out over each component carrier. For example, when there are two component carriers, similar to the FDD scenario, for each component carrier, the ACK/NACKs across all spatial layers are bundled. After spatial bundling, in one alternative, the ACK/NACKs are combined (e.g., bundled) across the component carriers and then bundled in time-domain. The result is mapped to particular values of b(0) and b(1). In one example, where two component carriers are used, the above noted time-domain bundling is carried out over only one-half of the subframes. In another alternative related to the TDD mode, subsequent to the spatial bundling over each component carrier, a time-domain bundling across all subframes is conducted and the result is mapped to particular values of b(0) and b(1). The above-noted operations in TDD systems may be utilized in systems that use two component carriers, as well as systems that use more than two component carriers. In the latter scenario, the bundled feedbacks provide a coarser identification of the ACK/NACKs.

In still another example, regardless of the number of component carriers or particular subframes, a first number of the ACK/NACK feedbacks are mapped to first bit, b(0), and the remaining ACK/NACK feedbacks are mapped to the second bit, b(1). Both bits are then transmitted over the SR resource with PUCCH Format 1b. In one example, the first half of ACK/NACK feedbacks are mapped to b(0), while the second half of ACK/NACK feedbacks are mapped to b(1). It should be noted that a combination of the above noted ACK/NACK bundling methods may be implemented in various situations. For example, in a system with two component carriers in FDD mode, the methodology that was described in connection with Table 2 may be utilized. Similarly, for a two component carrier system that operates in TDD mode, spatial bundling for each component carrier may be performed, followed by one or both of cross-component carrier bundling and time-domain bundling operations. In another example, for a system with more than two component carriers in FDD or TDD modes, the methodology that was described in connection with Table 1 may be employed. Accordingly, the specific bundling techniques may be adapted and combined based on particular system configurations, and the bundling technique(s) may be determined by the feedback scheme module 246 of FIG. 2, for example.

The above noted bundling techniques, for purposes of discussion and illustrations, described systems that are configured to operate using one SR resource. In some embodiments, however, two or more SR resources (or channels) may be configured to accommodate the transmission of ACK/NACKs for a positive SR, thereby increasing the signaling capacity for ACK/NACK feedbacks and/or unique states due to the added SR "channel selection" capability. For example, having two SR resources enables the user equipment to select between the first or the second resource for the transmission of ACK/NACK feedback for a positive SR. In such a scenario, the ACK/NACK signaling capacity is increased by 1 bit. In the above example with two possible SR resources, if the system is further configured to operate in FDD with two component carriers, the entire ACK/NACK information may be conveyed to the eNodeB without a need for bundling operations. In other scenarios, where a larger number of component carriers are present, the conveyance of the complete ACK/NACK feedbacks may not be possible. In such scenarios, spatial bundling for each component carrier can be performed, followed by applying the same rules for SR channel selection as the previously described ACK/NACK channel selection.

According to another embodiment, each user equipment is configured to operate using a primary SR resource, as well as one or more secondary SR resources. The primary SR resource is unique for each user equipment and is, therefore, reserved for exclusive use of that user equipment. The secondary SR resources can, for example, be RRC configured. In one example embodiment, at least one secondary SR resource is also unique for each user equipment. A user equipment may simply utilize an expanded field (i.e., the primary SR resource and one or more secondary SR resources) to transmit ACK/NACK feedbacks for a positive SR.

In another embodiment, the secondary SR resources are shared among two or more user equipment. To this end, a multiplicity of user equipment may be configured with one or more secondary SR resources that are at least partially overlapping with one another. The sharing of secondary SR resources among different user equipment allows a more efficient usage of uplink resources and reduces the signaling overhead. However, such a shared assignment can also lead to uplink transmissions by different user equipment on the same resource that are at least partially overlapping in time. In accordance with an example, such overlaps can be prevented by imposing certain limitations on feedback transmissions on the shared SR resources. For example, a time division multiplexing methodology can be used to ensure that each user equipment can only carry out transmissions using a shared SR resource during an assigned time period that is non-overlapping with the assigned time periods of other user equipment.

When configuring a user equipment with additional SR resources, it is possible to assign a different (and perhaps large) number of additional SR resources to each user equipment. However, practical considerations related to bandwidth utilization and computational complexity may limit the number of such additional shared resources. In one example embodiment, each user equipment is configured to operate using no more than two SR resources, where only one resource may be shared with other user equipment.

In another embodiment, additional control information from the base station (eNodeB) facilitates the selection of the shared SR resources by two or more user equipment. Such additional control information may, for example, be transmitted to the user equipment on PDCCH to signal which particular subset of shared resources can be used by a particular user equipment during a particular time interval. For example, an ACK/NACK resource indicator (ARI) or time-division multiplexing information may be provided to the user equipment to facilitate SR resource selection. The ARI can include information as to whether or not the user equipment is allowed to use shared resources and/or which particular subset of shared SR resources may be used by the user equipment. ARI may be transmitted on PDCCH using the transmit power control (TPC) field of one or more secondary component carriers. Therefore, the additional control information reduces or eliminates the possibility of uplink ACK/NACK feedback transmissions, by different user equipment, on the same PUCCH resources and at the same time.

Figure 5:
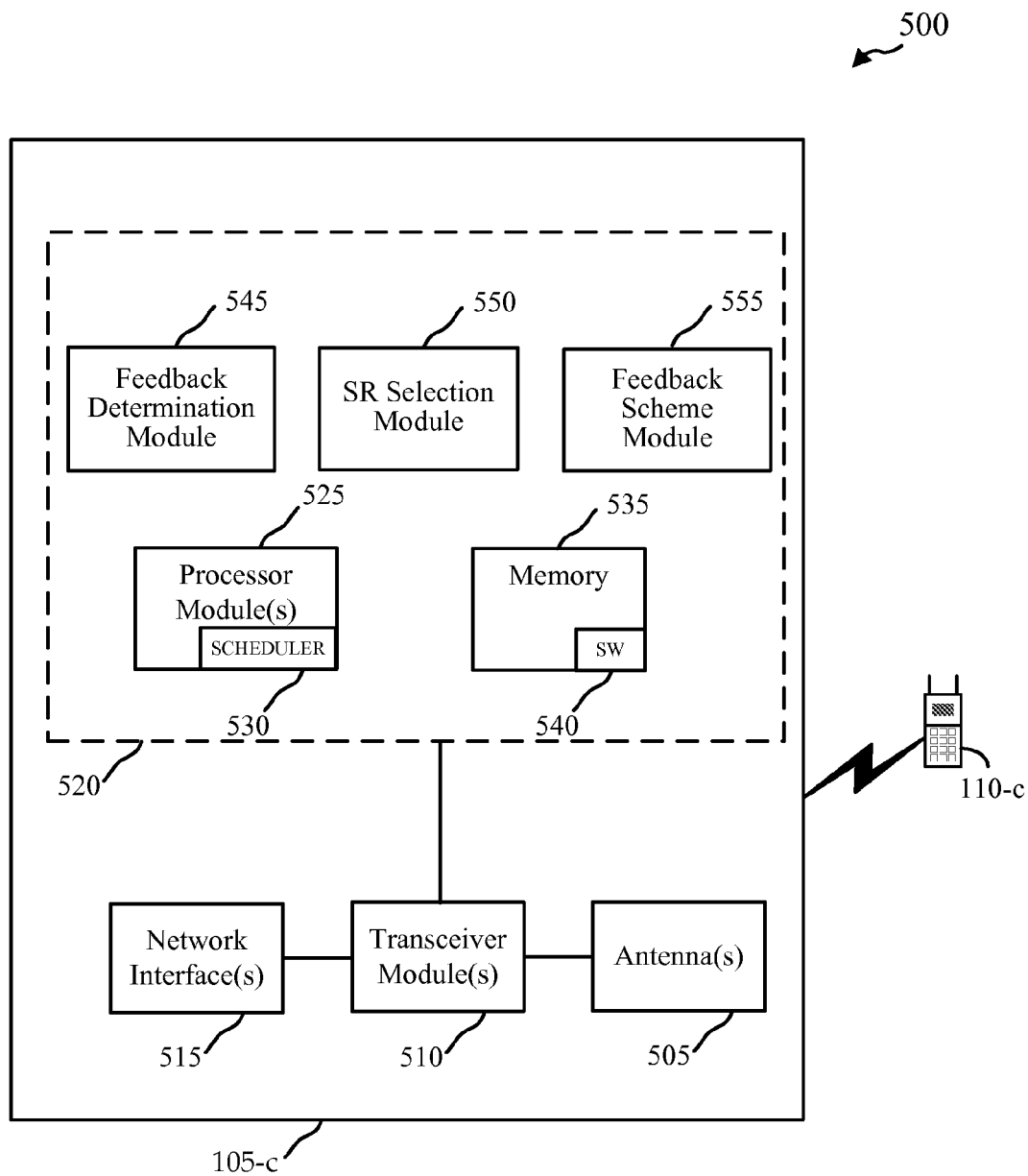
FIG. 5 is a block diagram of a base station that processes scheduling requests and ACK/NACK feedback from multi-carrier user equipment.

With reference now to FIG. 5, an example of a wireless communication system 500 that transmits control information for multiple component carriers is depicted. System 500 includes a base station 105-c and user equipment 110-c that may communicate with base station 105-c to receive access to a wireless network, as described. In addition, user equipment 110-c may receive communications over multiple downlink CCs, with ACK/NACK feedback associated with communications on the downlink CCs to be transmitted to the base station 105-c according to one or more of the various techniques described herein.

Base station 105-c includes one or more antennas 505, similarly as described above, communicatively coupled to transceiver module(s) 510. Network interfaces 515 may provide an interface to one or more networks associated with the wireless communications system 500. Base station 105-c includes a control module 520 that contains one or more processor module(s) 525 that includes a scheduler 530, a memory 535 including software 540, a feedback determination module 545, a SR selection module 550, and a feedback bundling scheme module 555. The scheduler 530 may be included in the one or more processor module(s) 525, and may schedule the user equipment 110-c on a subset of configured carriers under the influence of processor module(s) 525 and/or feedback scheme module 530, which may receive feedback via one or more SR resources. The components of the control module 520 may, individually or collectively, be implemented with one or more Application Specific Integrated Circuits (ASICs) adapted to perform some or all of the applicable functions in hardware. Each of the noted modules may be a means for performing one or more functions related to operation of the base station 105-c.

Feedback determination module 545 may determine the ACK/NACK feedback received from the mobile device 110-c, and determine if any re-transmissions are required based on the content of received ACK/NACK information. The feedback determination module 545 may also include an SR resource to ACK/NACK mapping component that maps the received bits on the SR resource to ACK/NACKs associated with particular component carriers, frames or subframes. SR selection module 550 may operate to identify scheduling request resources that are available for user equipment 110-c to transmit SRs and included ACK/NACK feedback. In some embodiments, the SR selection module 550 allocates one or more SR resources on PUCCH for the user equipment 110-c and/or any other user equipment (not shown) that is served by the base station 105-c. SR selection module 550 may also generate control information, such as an ACK/NACK resource indicator (ARI) or time-division multiplexing information, to facilitate SR resource selection by the user equipment 110-c. The ARI can include information as to whether or not the user equipment 110-c is allowed to use the shared resources and/or which particular subset of shared SR resources may be used by the user equipment. Feedback scheme module 555 may operate to identify a feedback bundling scheme based on the downlink transmission mode and available SR resources, similarly as described above. The base station 105-c is thus able to communicate with user equipment 110-c according to the identified downlink transmission mode and feedback scheme.

In addition, feedback scheme module 555 may also indicate one or more parameters regarding ACK/NACK feedback bundling, such as mapping parameters, as described above. Moreover, for example, feedback bundling scheme module 555 may indicate whether to bundle CC feedback for a subset of CCs that are to be mapped to particular bits in the SR resource(s), as described above. In this regard, for example, feedback scheme module 555 may communicate the one or more feedback format parameters to the user equipment 110-c, and user equipment 110-c may bundle feedback according to the one or more parameters, as described above, and may act to reduce feedback overhead. Processing module(s) 525 may obtain feedback for multiple CCs from user equipment 110-c bundled in a feedback format that is transmitted to the base station 105-c via one or more SR resources, as described, and can utilize the bundled feedback to determine whether communications need to be retransmitted over one or more of the multiple CCs.

The processor module(s) 525 may include an intelligent hardware device, e.g., a central processing unit (CPU) such as those made by QUALCOMM Incorporated, Intel® Corporation or AMD®, a microcontroller, an application specific integrated circuit (ASIC), etc. The memory 475 may include random access memory (RAM) and read-only memory (ROM). The memory 475 may store computer-readable, computer-executable software code 480 containing instructions that are configured to, when executed (or when compiled and executed), cause the processor module 475 to perform various functions described herein (e.g., feedback bundling scheme identification, downlink transmission mode identification, etc.).

Figure 6:
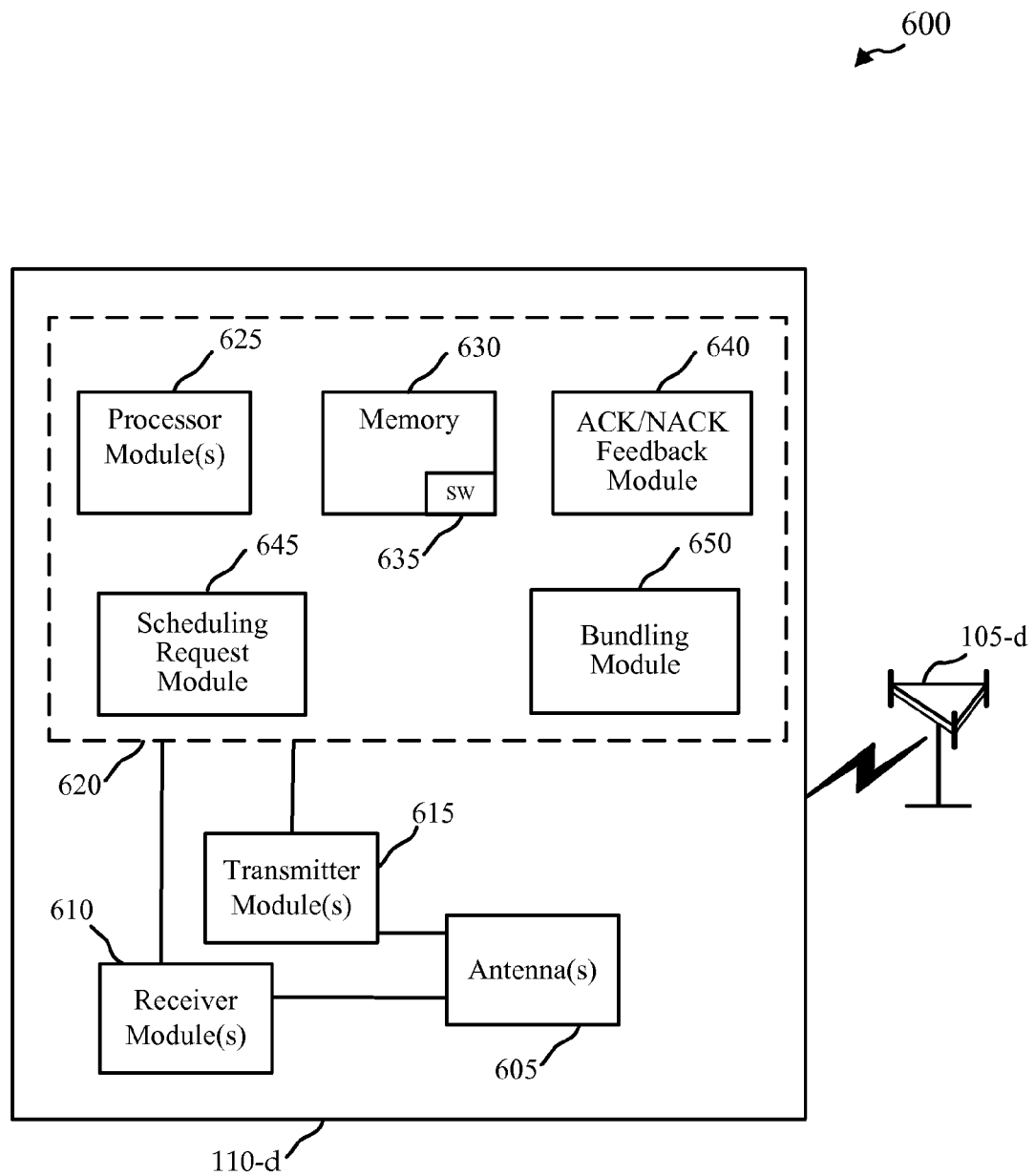
FIG. 6 is a block diagram of a mobile device configured to transmit a SR and ACK/NACK feedback for multiple CCs in an uplink subframe.

Referring now to FIG. 6 an example wireless communication system 600 that bundles feedback for multiple component carriers is depicted. System 600 includes a base station 105-d and user equipment 110-d that can communicate with base station 105-d to receive access to a wireless network, similarly as described above. User equipment 110-d includes one or more antenna(s) 605 communicatively coupled to receiver module(s) 610 and transmitter module(s) 615, which are in turn communicatively coupled to a control module 620. Control module 620 includes one or more processor module(s) 625, a memory 630 that contains software 635 for execution by processor module 625, an ACK/NACK feedback module 640, a scheduling request module 645, and a bundling module 650.

The processor module 625 may include an intelligent hardware device, e.g., a central processing unit (CPU) such as those made by Intel® Corporation or AMD®, a microcontroller, an application specific integrated circuit (ASIC), etc. The memory 630 may include random access memory (RAM) and read-only memory (ROM). The memory 630 may store computer-readable, computer-executable software code 635 containing instructions that are configured to, when executed (or when compiled and executed), cause the processor module 625 to perform various functions described herein (e.g., feedback bundling, feedback mapping, SR generation, etc.).

The transmitter module(s) 615 can transmit to base station 105-d (and/or other base stations) over one or more uplink CCs, as described above. The receiver module(s) 620 can receive downlink transmissions from base station 105-d (and/or other base stations) over two or more downlink CCs, as described above. Downlink transmissions are received and processed at the user equipment 110-d. ACK/NACK feedback module 640 may identify a feedback bundling scheme that is to be used in formatting and transmitting ACK/NACK feedback, as described above. ACK/NACK feedback module 640 may determine ACK/NACK feedback values for communications received (or not received) over the plurality of downlink CCs. Scheduling request module 645 may determine if a positive SR is present, and provide this information to processor module(s) 625. The scheduling request module 645 also is configured to ascertain SR resources that are available to the user equipment 110-d. In some examples, the SR module 645 selects SR resources from a set of SR resources configured for use by user equipment 110-d to increase the effective number of bits signaled to base station 105-d using a particular control information format. For example, SR module 645 may indicate two additional bits through its selection from four configured SR resources. Thus, with PUCCH format 1b, four bits of ACK/NACK feedback can be provided when the additional SR resources are configured for user equipment 110-d.

Similarly, SR module 645 can select a first SR resource from two or more available SR resources when ACK/NACK feedback for a first component carrier meets a first criteria, and a second SR resource when ACK/NACK feedback for the first component carrier meets a second criteria. In such a manner, the selection of a particular SR resource conveys ACK/NACK feedback information for the first component carrier. Bundling module 650 may perform ACK/NACK feedback bundling based on an identified bundling scheme and a positive SR, and generate bundled ACK/NACK feedback for transmission on the SR resource. The bundling module 650 may carry out bundling operations such as spatial bundling within one or more component carriers, bundling across two or more component carriers, bundling in time domain, and the like. In some aspects, the ACK/NACK feedback for one or more of the component carriers may be mapped to different bits in the identified SR resource, similarly as described above.

In one example, the user equipment 110-d is an LTE user equipment and the plurality of component carriers comprise first and second FDD carriers. In such a case, the ACK/NACK feedback module 640 may determine ACK/NACK feedback for one or more codewords received on each of the first and second FDD component carriers. Bundling module 650 may then spatially bundle the ACK/NACK feedback for the first FDD component carrier to obtain a first ACK/NACK bit, spatially bundle the ACK/NACK feedback for the second FDD component carrier to obtain a second ACK/NACK bit, and generate a PUCCH format 1b message with the first and second ACK/NACK bits comprising bundled ACK/NACK feedback. The PUCCH format 1b message may then be transmitted on the identified SR resource. In some examples, the bundling module 650 may also determine one or more additional states for one or more of the first and second component carriers, such as (ACK, NAK/DTX) and (NAK/DTX, ACK), for one or more of the component carriers, and generate a PUCCH format 1b message with the one or more additional states.

In another example, the user equipment 110-*d* is an LTE user equipment and the plurality of component carriers comprise TDD carriers. In such an example, the ACK/NACK feedback module 640 may determine ACK/NACK feedback for a data transmission on a first TDD component carrier and a second TDD component carrier. The bundling module 650 in such a case may determine a number of ACK instances for the data transmission on the first and second component carriers based on the ACK/NACK information, determine first and second bit values for the ACK/NACK feedback based on a mapping of the number of ACK instances, and generate a PUCCH format 1b message with the first and second bits comprising the bundled ACK/NACK feedback. The number of ACK instances for the data transmission on the first and second component carriers may include spatial bundling of ACK/NACK information.

Figure 7:
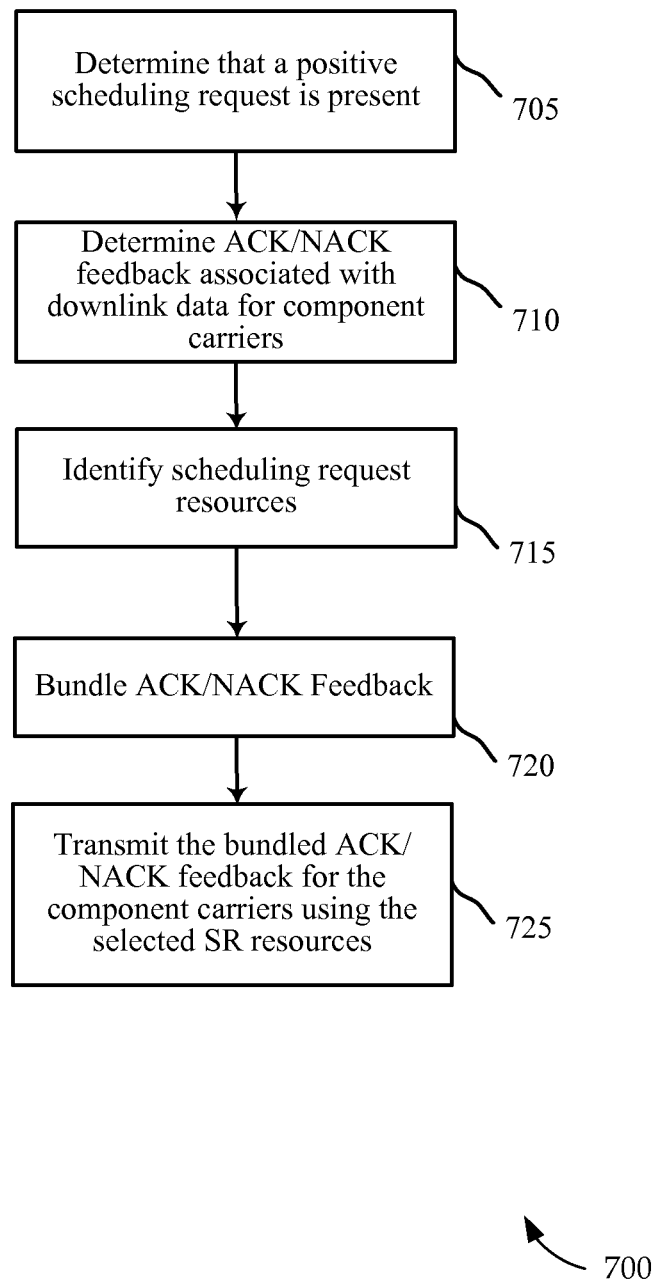
FIG. 7 is a flowchart of a method generating uplink control information by a multi-carrier user equipment.

FIG. 7 illustrates a method 700 that may be carried out by a user equipment to transmit ACK/NACK feedback for communications received on a plurality of downlink component carriers. The method 700 may, for example, be performed by a user equipment of FIG. 1, 2, 3, 5 or 6, or using any combination of the devices described for these figures. Initially, at block 705, it is determined that a positive scheduling request is present. As discussed above, in the event that a positive SR is present, ACK/NACK feedback associated with downlink component carriers is transmitted using one or more SR resources. ACK/NACK feedback associated with downlink data for component carriers is determined at block 710. ACK/NACK feedback is determined based on known techniques, with an ACK determined when downlink information on a CC is successfully received and decoded, and a NACK determined when downlink information is not successfully received and decoded. At block 715, scheduling request (SR) resources are identified. SR resources may be identified in a manner such as described above, including identification of SR resources according to PUCCH Format 1b. In some examples, one or more secondary SR resources may be selected, as discussed above. At block 720, ACK/NACK feedback is bundled. ACK/NACK feedback may be bundled, for instance, according to the exemplary mapping of Table 1 to map an ACK count to the two available bits in PUCCH Format 1b. ACK/NACKs may also, or alternatively, be spatially bundled for each component carrier, bundled across two or more component carriers, bundled in time for one or more component carriers, and combinations thereof. The bundled ACK/NACK feedback for the component carriers is transmitted using the selected SR resources, as noted at block 725.

Figure 8:
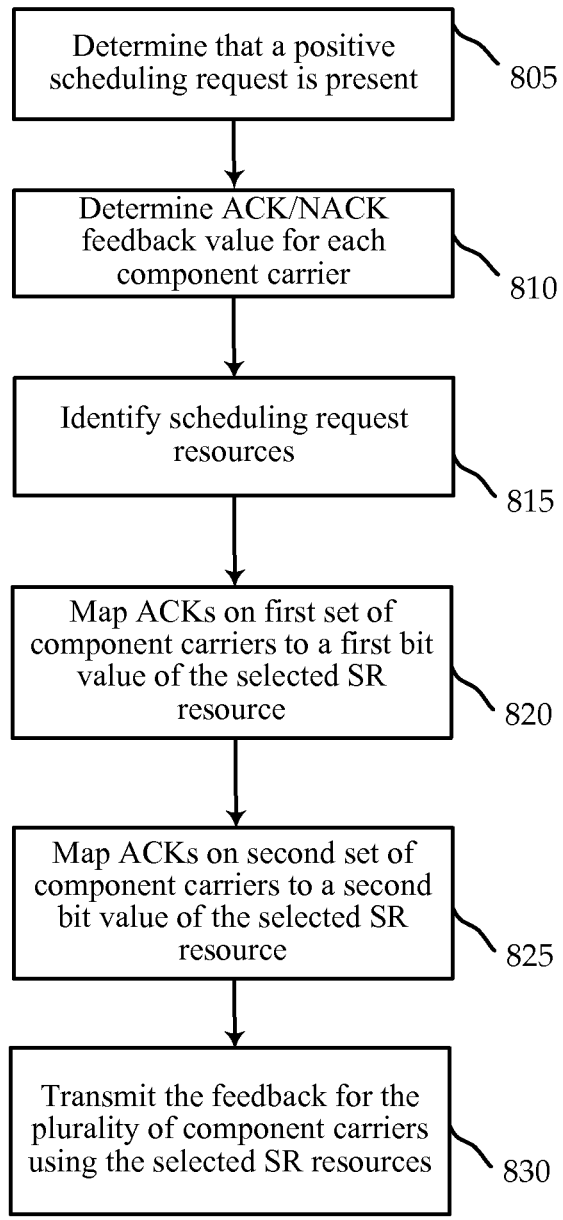
FIG. 8 is a flowchart of another method for generating uplink control information by a multi-carrier user equipment.

Referring now to FIG. 8, another method 800 that may be carried out by a user equipment to transmit ACK/NACK feedback for communications received on a plurality of downlink component carriers is described. The method 800 may, for example, be performed by a user equipment of FIG. 1, 2, 3, 5 or 6, or using any combination of the devices described for these figures. In this exemplary method, it is initially determined, at block 805 that a positive scheduling request is present. As discussed above, in the event that a positive SR is present, ACK/NACK feedback associated with downlink component carriers is transmitted using one or more SR resources. ACK/NACK feedback associated with downlink data for component carriers is determined at block 810. ACK/NACK feedback is determined based on known techniques, as described above. At block 815, scheduling request (SR) resources are identified. SR resources may be identified in a manner such as described above, including identification of SR resources according to PUCCH Format 1b. In some examples, one or more secondary SR resources may be selected, as discussed above. At block 820, ACKs on a first set of component carriers are mapped to a first bit value of the selected SR resource. For example, ACKs from the first set of component carriers may be mapped to a first bit of the two available bits in PUCCH Format 1b. At block 825, ACKs on a second set of component carriers are mapped to a second bit value of the selected SR resource. In an example, ACKs from the second set of component carriers may be mapped to a second bit of the two available bits in PUCCH Format 1b. The ACK/NACK feedback for the component carriers, as mapped to the bit values of the selected SR resource, is transmitted using the selected SR resources, as noted at block 830.

Figure 9:
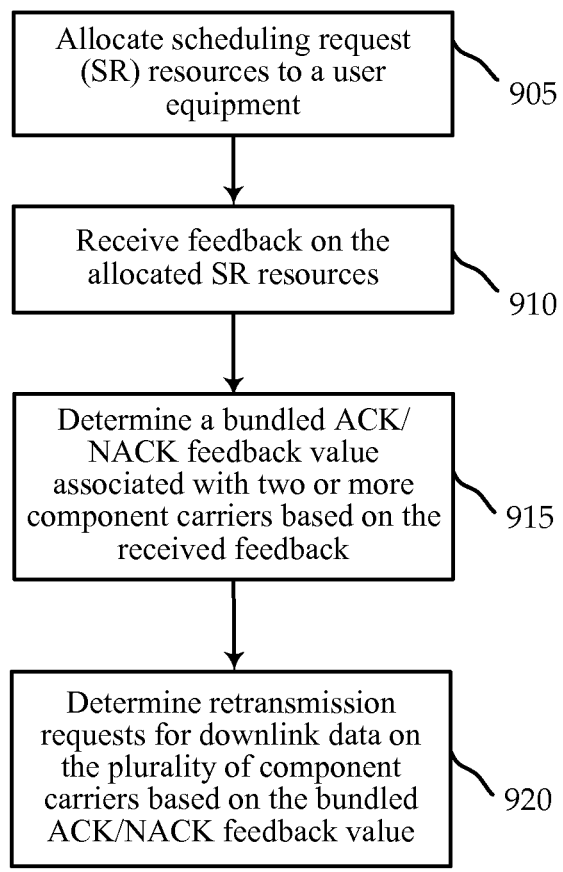
FIG. 9 is a flowchart of a method for processing control channel transmissions from a multi-carrier wireless device.

Referring now to FIG. 9, a method 900 that may be carried out by a base station to determine ACK/NACK feedback transmitted from a user equipment. The method 900 may, for example, be performed by a base station of FIG. 1, 2, 3, 5 or 6, or using any combination of the devices described for these figures. Initially, at block 905, one or more scheduling request (SR) resources are allocated to a user equipment. As noted earlier, such SR resources may include a primary SR resource, and may also include one or more secondary SR resources. Additionally, in some cases, at least a portion of the secondary SR resource(s) may be shared among multiple user equipment. The allocation of SR resource(s) may be accomplished through, for example, generation and transmission of control information the user equipment, such as the ARI and/or information related to time-division multiplexing of secondary SR resources among multiple user equipment. In one example, the ARI is transmitted on PDCCH using the TPC field of one or more secondary component carriers. With continued reference to the method 900, feedback is received from the user equipment on the allocated SR resources, as noted at block 910. The reception of ACK/NACK feedback on SR resources is indicative of a positive SR. A bundled ACK/NACK feedback value associated with two or more component carriers is determined based on the received feedback, as indicated at block 915. The bundled ACK/NACK feedback value may be determined according to the bundling scheme used by the user equipment, such as an accumulated ACK count for a plurality of component carriers, time domain bundling, and/or spatial bundling, for example. At block 920, any retransmission requests for downlink data on the plurality of component carriers are determined based on the bundled ACK/NACK feedback value.

Figure 10:
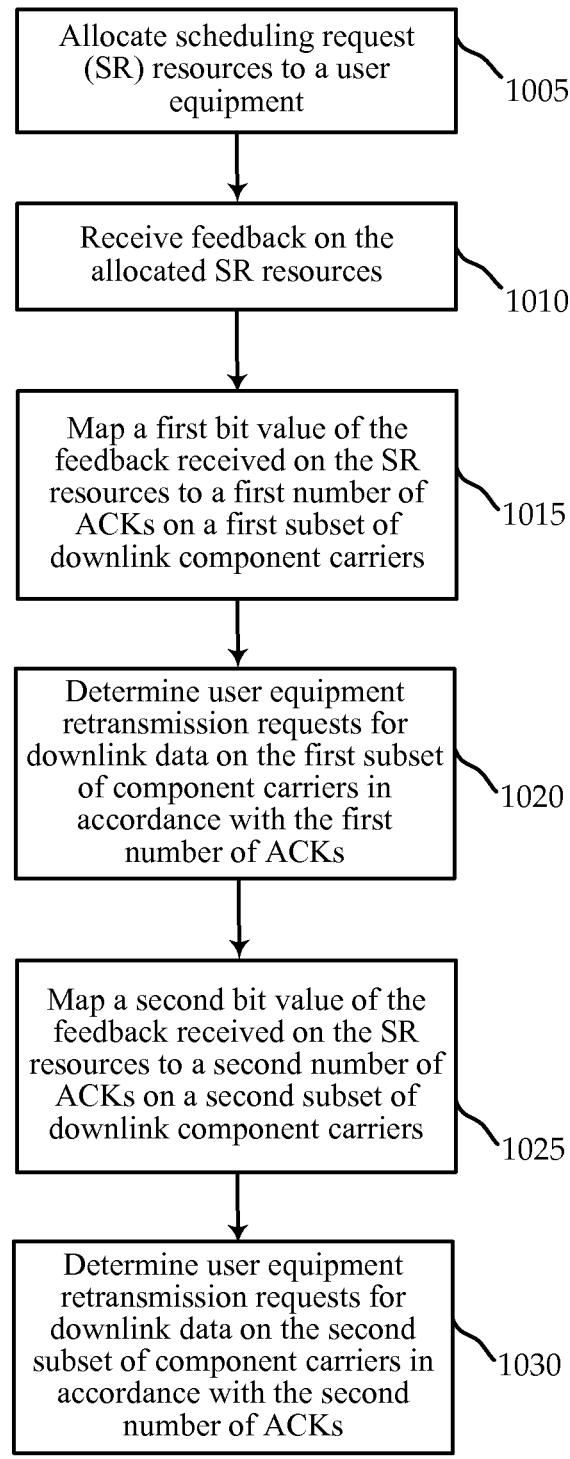
FIG. 10 is a flowchart of another method for processing control channel transmissions from a multi-carrier wireless device.

FIG. 10 illustrates another method 1000 that may be carried out by a base station to determine ACK/NACK feedback transmitted from a user equipment. The method 1000 may, for example, be performed by a base station of FIG. 1, 2, 3, 5 or 6, or using any combination of the devices described for these figures. Initially, at block 1005, one or more scheduling request (SR) resources are allocated to a user equipment. As noted earlier, such SR resources may include a primary SR resource, and may also include one or more secondary SR resources. Additionally, in some cases, at least a portion of the secondary SR resource(s) may be shared among multiple user equipment. Feedback is received from the user equipment on the allocated SR resources, as noted at block 1010. The reception of ACK/NACK feedback on SR resources is indicative of a positive SR. At block 1015, a first bit value of the feedback received on the SR resources is mapped to a first number of ACKs on a first subset of downlink component carriers. For example, a value of a first bit of the two available bits in PUCCH Format 1b may be mapped to one or more ACKs that are present on the first subset of component carriers. The first number of ACKs is used to determine user equipment retransmission requests for downlink data on the first subset of component carriers, as indicated at block 1020. A second bit value of the feedback received on the SR resources is mapped to a second number of ACKs on a second subset of downlink component carriers at block 1025. User equipment retransmission requests for downlink data on the second subset of component carriers is determined in accordance with the second number of ACKs at block 1030, similarly as in block 1020. In the event any retransmissions are required, the base station may initiate retransmissions based on the determined retransmission requests.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), then the coaxial cable, fiber optic cable, twisted pair, or DSL are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication, comprising:
   determining, at a user equipment, acknowledgment/negative acknowledgment (ACK/NACK) feedback associated with downlink data for a plurality of component carriers;
   identifying one or more scheduling request (SR) resources available to the user equipment upon a determination that a positive SR is present;
   bundling the ACK/NACK feedback; and
   transmitting the bundled ACK/NACK feedback for the plurality of component carriers using the one or more selected SR resources,
   wherein the bundled ACK/NACK feedback is mapped onto the one or more selected SR resources in a manner based on whether the wireless communication is according to a time-division duplex (TDD) or frequency-division duplex (FDD) mode of operation, wherein in the FDD mode of operation, the bundling the ACK/NACK feedback comprises:
   determining ACK/NACK feedback values for first and second component carriers; and
   mapping the ACK/NACK feedback for the first component carrier to a first bit value associated with the one or more SR resources and mapping the ACK/NACK feedback for the second component carrier to a second bit value associated with the one or more SR resources,
   and wherein in the TDD mode of operation, the bundling the ACK/NACK feedback comprises:
   determining a number of ACK instances for data transmissions on first and second TDD component carriers; and
   mapping the number of ACK instances to first and second bit values associated with the one or more SR resources.

2. The method of claim 1, wherein the bundling the ACK/NACK feedback comprises:
   determining an ACK/NACK feedback value for each component carrier; and
   aggregating the number of ACKs across the component carriers.

3. The method of claim 1, wherein the bundling the ACK/NACK feedback comprises:
   determining an ACK/NACK feedback value for each component carrier:,
   determining a total number of ACK instances; and
   mapping a first number of ACKs to a first bit value associated with the one or more SR resources and mapping a remaining number of ACKs to a second bit value associated with the one or more SR resources.

4. The method of claim 3, wherein the first number of ACKs correspond to ACKs in a first subset of the plurality of component carriers, and the remaining number of ACKs correspond to the remaining of the plurality of component carriers.

5. The method of claim 4, wherein the first subset of the plurality of component carriers comprises a first component carrier, and the remaining of the plurality of component carriers comprises a second component carrier.

6. The method of claim 1, wherein the bundling the ACK/NACK feedback comprises:
   determining an ACK/NACK feedback value for each component carrier; and
   spatially bundling ACK/NACK feedback for two or more subframes of one or more of the component carriers.

7. The method of claim 1, wherein the user equipment is an LTE user equipment and wherein in the FDD mode of operation, the bundling the ACK/NACK feedback comprises:
   determining ACK/NACK feedback for one or more codewords received on each of a first FDD component carrier and on a second FDD component carrier in the plurality of component carriers,
   spatially bundling the ACK/NACK feedback for the first FDD component carrier to obtain a first ACK/NACK bit,
   spatially bundling the ACK/NACK feedback for the second FDD component carrier to obtain a second ACK/NACK bit; and
   wherein the transmitting the bundled ACK/NACK feedback comprises:
   generating a PUCCH format 1b message with the first and second ACK/NACK bits comprising the bundled ACK/NACK feedback; and
   transmitting the PUCCH format 1b message on the identified SR resource.

8. The method of claim 7, wherein bundling the ACK/NACK feedback further comprises:
   determining one or more additional states for one or more of the first and second component carriers, the one or more additional states comprising (ACK, negative acknowledgment/discontinuous transmission (NAK/DTX)) and (NAK/DTX, ACK) for one or more of the first and second component carriers; and wherein the transmitting the bundled ACK/NACK feedback comprises:
   generating a PUCCH format 1b message with the one or more additional states; and
   transmitting the PUCCH format 1b message on the identified SR resource.

9. The method of claim 1, wherein the user equipment is an LTE user equipment and wherein in the TDD mode of operation, bundling the ACK/NACK feedback comprises:
   determining first and second bit values for the ACK/NACK feedback based on the mapping the number of ACK instances; and
   wherein the transmitting the bundled ACK/NACK feedback comprises:
   generating a PUCCH format 1b message with the first and second bits comprising the bundled ACK/NACK feedback; and
   transmitting the PUCCH format 1b message on the identified SR resource.

10. The method of claim 9, wherein determining a number of ACK instances for the data transmission comprises spatial bundling of ACK/NACK information.

11. The method of claim 1, wherein identifying one or more scheduling request (SR) resources available to the user equipment upon a determination that a positive SR is present comprises:

selecting a first SR resource from two or more configured SR resources when ACK/NACK feedback for a first component carrier meets a first criteria; and selecting a second SR resource from two or more configured SR resources when ACK/NACK feedback for the first component carrier meets a second criteria.

12. The method of claim 1, wherein the one or more SR resources are radio resource control (RRC) configured.

13. The method of claim 12, wherein at least one secondary SR resource is shared between the user equipment and another user equipment.

14. The method of claim 12, wherein the selection of the one or more SR resources comprises selecting at least one secondary SR resource in accordance with a received control information.

15. The method of claim 12, wherein the received control information comprises at least one of an ACK/NACK resource indicator (ARI) and a time-division multiplexing information.

16. The method of claim 12, wherein the control information is received as part of a transmit power control (TPC) field on a physical downlink control channel (PDCCH) associated with a secondary component carrier.

17. The method of claim 1, wherein the ACK/NACK feedback is transmitted on a physical uplink control channel (PUCCH) of a long term evolution (LTE) wireless communication system that is configured to operate using uplink control information Format 1b.

18. A wireless communications apparatus, comprising:
means for determining, at a user equipment, acknowledgment/negative acknowledgment (ACK/NACK) feedback associated with downlink data for a plurality of component carriers;
means for identifying one or more scheduling request (SR) resources available to the user equipment upon a determination that a positive SR is present;
means for bundling the ACK/NACK feedback; and
means for transmitting the bundled ACK/NACK feedback for the plurality of component carriers using the one or more selected SR resources,
wherein the bundled ACK/NACK feedback is mapped onto the one or more selected SR resources in a manner based on whether the wireless communication is according to a time-division duplex (TDD) or frequency-division duplex (FDD) mode of operation, wherein in the FDD mode of operation, the bundling the ACK/NACK feedback comprises:
determining ACK/NACK feedback values for first and second component carriers; and
mapping the ACK/NACK feedback for the first component carrier to a first bit value associated with the one or more SR resources and mapping the ACK/NACK feedback for the second component carrier to a second bit value associated with the one or more SR resources,
and wherein in the TDD mode of operation, the bundling the ACK/NACK feedback comprises:
determining a number of ACK instances for data transmissions on first and second TDD component carriers; and
mapping the number of ACK instances to first and second bit values associated with the one or more SR resources.

19. The apparatus of claim 18, wherein the means for bundling the ACK/NACK feedback comprises:
means for determining an ACK/NACK feedback value for each component carrier; and
means for aggregating the number of ACKs across the component carriers.

20. The apparatus of claim 18, wherein the means for bundling the ACK/NACK feedback comprises:
means for determining an ACK/NACK feedback value for each component carrier;
means for determining the total number of ACK instances; and
means for mapping a first number of ACKs to a first bit value associated with the one or more SR resources and mapping remaining number of ACKs to a second bit value associated with the one or more SR resources.

21. The apparatus of claim 20, wherein the first number of ACKs correspond to ACKs in a first subset of the plurality of component carriers, and the remaining number of ACKs correspond to the remaining of the plurality of component carriers.

22. The apparatus of claim 18, wherein the means for bundling the ACK/NACK feedback comprises:
means for determining an ACK/NACK feedback value for each component carrier; and
means for spatially bundling ACK/NACK feedback for two or more subframes of one or more of the component carriers.

23. A wireless communication apparatus, comprising:
an acknowledgment/negative acknowledgment (ACK/NACK) feedback module configured to determine ACK/NACK feedback associated with downlink data for a plurality of component carriers;
a scheduling request (SR) module configured to select one or more SR resources upon a determination that a positive SR is present;
a bundling module configured to bundle the ACK/NACK feedback; and
a transmitter module configured to transmit the bundled ACK/NACK feedback for the plurality of component carriers using the one or more selected SR resources,
wherein the bundled ACK/NACK feedback is mapped onto the one or more selected SR resources in a manner based on whether the wireless communication is according to a time-division duplex (TDD) or frequency-division duplex (FDD) mode of operation, wherein in the FDD mode of operation, the bundling module is configured to:
determine ACK/NACK feedback values for first and second component carriers; and
map the ACK/NACK feedback for the first component carrier to a first bit value associated with the one or more SR resources and map the ACK/NACK feedback for the second component carrier to a second bit value associated with the one or more SR resources,
and wherein in the TDD mode of operation, the bundling module is configured to:
determine a number of ACK instances for data transmissions on first and second TDD component carriers; and
map the number of ACK instances to first and second bit values associated with the one or more SR resources, and
wherein at least one of the ACK/NACK feedback module, the SR module, the bundling module, or the transmitter module is implemented at least in part in hardware.

24. The wireless communication apparatus of claim 23, wherein
the one or more SR resources comprise a primary SR resource and one or more secondary SR resources.

25. The wireless communication apparatus of claim 24, wherein the one or more secondary SR resources are radio resource control (RRC) configured.

26. The wireless communication apparatus of claim 24, wherein at least one secondary SR resource is shared between the wireless communication apparatus and another wireless communication apparatus.

27. The wireless communication apparatus of claim 24, wherein the SR module is further configured to select at least one secondary SR resource in accordance with a received control information.

28. The wireless communication apparatus of claim 27, wherein the control information is received as part of a transmit power control (TPC) field on a physical downlink control channel (PDCCH) of a secondary component carrier.

29. The wireless communication apparatus of claim 24, wherein the bundling module is further configured to:
   map a first number of ACKs to a first bit value associated with the one or more SR resources and map remaining number of ACKs to a second bit value associated with the one or more SR resources.

30. The wireless communication apparatus of claim 23, wherein the wireless communication apparatus is an LTE user equipment and the plurality of component carriers comprise frequency division duplex (FDD) carriers, wherein:
   the ACK/NACK feedback module is further configured to determine ACK/NACK feedback for one or more codewords received on each of a first FDD component carrier and on a second FDD component carrier in the plurality of component carriers, and
   the bundling module is further configured to spatially bundle the ACK/NACK feedback for the first FDD component carrier to obtain a first ACK/NACK bit, spatially bundle the ACK/NACK feedback for the second FDD component carrier to obtain a second ACK/NACK bit, and generate a PUCCH format 1b message with the first and second ACK/NACK bits comprising the bundled ACK/NACK feedback.

31. The wireless communication apparatus of claim 23, wherein the wireless communication apparatus is an LTE user equipment and the plurality of component carriers comprise time division duplex (TDD) carriers, wherein:
   the ACK/NACK feedback module is further configured to determine ACK/NACK feedback for a data transmission on a first TDD component carrier and a second TDD component carrier in the plurality of component carriers, and
   the bundling module is further configured to determine a number of ACK instances for the data transmission on the first and second component carriers based on the ACK/NACK information, determine first and second bit values for the ACK/NACK feedback based on a mapping of the number of ACK instances; and generate a PUCCH format 1b message with the first and second bits comprising the bundled ACK/NACK feedback.

32. The wireless communication apparatus of claim 23, wherein the bundling module is further configured to, upon a determination that a positive SR is present, select a first SR resource from two or more configured SR resources for transmission of ACK/NACK feedback when ACK/NACK feedback for a first component carrier meets a first criteria, and select a second configured SR resource from two or more available SR resources for transmission of ACK/NACK feedback when ACK/NACK feedback for the first component carrier meets a second criteria.

33. A computer program product for wireless communication, comprising:
   a non-transitory computer readable medium comprising:
   code for determining acknowledgment/negative acknowledgment (ACK/NACK) feedback associated with downlink data for a plurality of component carriers;
   code for selecting one or more available scheduling request (SR) resources upon a determination that a positive SR is present;
   code for bundling the ACK/NACK feedback; and
   code for transmitting the bundled ACK/NACK feedback for the plurality of component carriers using the one or more selected SR resources,
   wherein the bundled ACK/NACK feedback is mapped onto the one or more selected SR resources in a manner based on whether the wireless communication is according to a time-division duplex (TDD) or frequency-division duplex (FDD) mode of operation, wherein in the FDD mode of operation, the bundling the ACK/NACK feedback comprises:
   determining ACK/NACK feedback values for first and second component carriers; and
   mapping the ACK/NACK feedback for the first component carrier to a first bit value associated with the one or more SR resources and mapping the ACK/NACK feedback for the second component carrier to a second bit value associated with the one or more SR resources,
   and wherein in the TDD mode of operation, the bundling the ACK/NACK feedback comprises:
   determining a number of ACK instances for data transmissions on first and second TDD component carriers; and
   mapping the number of ACK instances to first and second bit values associated with the one or more SR resources.

34. The computer program product of claim 33, wherein the code for bundling the ACK/NACK feedback comprises:
   code for determining an ACK/NACK feedback value for each component carrier; and
   code for aggregating the number of ACKs across the component carriers.

35. The computer program product of claim 33, wherein the code for bundling the ACK/NACK feedback comprises:
   code for determining an ACK/NACK feedback value for each component carrier;
   code for determining the total number of ACK instances; and
   code for mapping a first number of ACKs to a first bit value associated with the one or more SR resources and mapping remaining number of ACKs to a second bit value associated with the one or more SR resources.

36. The computer program product of claim 35, wherein the first number of ACKs correspond to ACKs in a first subset of the plurality of component carriers, and the remaining number of ACKs correspond to the remaining of the plurality of component carriers.

37. The computer program product of claim 33, wherein the code for bundling the HARQ feedback comprises:
   code for determining an ACK/NACK feedback value for each component carrier; and
   code for spatially bundling ACK/NACK feedback for two or more subframes of one or more of the component carriers.

38. A method of wireless communication, comprising:
   allocating one or more scheduling request (SR) resources to a user equipment configured to operate in a wireless communication system with a plurality of component carriers;

receiving bundled ACK/NACK feedback on the one or more SR resources allocated to the user equipment, wherein the bundled ACK/NACK feedback is mapped onto the one or more selected SR resources in a manner based on whether the wireless communication is according to a time-division duplex (TDD) or frequency-division duplex (FDD) mode of operation, wherein in the FDD mode of operation, the bundled ACK/NACK feedback comprises ACK/NACK feedback values determined for first and second component carriers, wherein the ACK/NACK feedback for the first component carrier is mapped to a first bit value associated with the one or more SR resources and the ACK/NACK feedback for the second component carrier is mapped to a second bit value associated with the one or more SR resources, and wherein in the TDD mode of operation, the bundled ACK/NACK feedback comprises a number of ACK instances for data transmissions on first and second TDD component carriers mapped to first and second bit values associated with the one or more SR resources; and determining user equipment retransmission requests for downlink data on the plurality of component carriers in accordance with the received ACK/NACK feedback.

39. The method of claim 38, wherein determining the user equipment retransmission requests comprises:

mapping information received on the one or more SR resources to positive acknowledgment (ACK) and/or negative acknowledgement (NACK) feedbacks associated with downlink data of the user equipment.

40. The method of claim 38, wherein determining the user equipment retransmission requests comprises:

mapping a first bit value associated with the one or more SR resources to a first number of ACKs on a first subset of the plurality of component carriers;

determining the user equipment retransmission requests for downlink data on the first subset of the plurality of component carriers in accordance with the first number of ACKs;

mapping a second bit value associated with the one or more SR resources to a second number of ACKs on a second subset of the plurality of component carriers; and determining the user equipment retransmission requests for downlink data on the second subset of the plurality of component carriers in accordance with the second number of ACKs.

41. The method of claim 40, wherein the first number of ACKs correspond to ACKs on a first component carrier, and the second number of ACKs correspond to ACKS on a second component carrier.

42. The method of claim 38, wherein at least one of the one or more SR resources is shared between two or more user equipment.

43. A wireless communications apparatus, comprising:

means for allocating one or more scheduling request (SR) resources to a user equipment configured to operate in a wireless communication system with a plurality of component carriers;

means for receiving bundled acknowledgment/negative acknowledgement (ACK/NACK) feedback on the one or more SR resources allocated to the user equipment, wherein the bundled ACK/NACK feedback is mapped onto the one or more selected SR resources in a manner based on whether the wireless communication is according to a time-division duplex (TDD) or frequency-division duplex (FDD) mode of operation, wherein in the FDD mode of operation, the bundled ACK/NACK feedback comprises ACK/NACK feedback values determined for first and second component carriers, wherein the ACK/NACK feedback for the first component carrier is mapped to a first bit value associated with the one or more SR resources and the ACK/NACK feedback for the second component carrier is mapped to a second bit value associated with the one or more SR resources, and wherein in the TDD mode of operation, the bundled ACK/NACK feedback comprises a number of ACK instances for data transmissions on first and second TDD component carriers mapped to first and second bit values associated with the one or more SR resources; and means for determining the user equipment retransmission requests for downlink data on the plurality of component carriers in accordance with the received ACK/NACK feedback.

44. The apparatus of claim 43, wherein the means for determining the user equipment retransmission requests comprises:

means for mapping information received on the one or more SR resources to positive acknowledgment (ACK) and/or negative acknowledgement (NACK) feedbacks associated with downlink data of the user equipment.

45. The apparatus of claim 43, wherein the means for determining the user equipment retransmission requests comprises:

means for mapping a first bit value associated with the one or more SR resources to a first number of ACKs on a first subset of the plurality of component carriers;

means for determining the user equipment retransmission requests for downlink data on the first subset of the plurality of component carriers in accordance with the first number of ACKs;

means for mapping a second bit value associated with the one or more SR resources to a second number of ACKs on a second subset of the plurality of component carriers; and means for determining the user equipment retransmission requests for downlink data on the second subset of the plurality of component carriers in accordance with the second number of ACKs.

46. The apparatus of claim 45, wherein the first number of ACKs correspond to ACKs on a first component carrier, and the second number of ACKs correspond to ACKS on a second component carrier.

47. A computer program product for wireless communication, comprising:

a non-transitory computer readable medium comprising:

code for allocating one or more scheduling request (SR) resources to a user equipment configured to operate in a wireless communication system with a plurality of component carriers;

code for receiving bundled acknowledgment/negative acknowledgement (ACK/NACK) feedback on the one or more SR resources allocated to the user equipment, wherein the bundled ACK/NACK feedback is mapped onto the one or more selected SR resources in a manner based on whether the wireless communication is according to a time-division duplex (TDD) or frequency-division duplex (FDD) mode of operation, wherein in the FDD mode of operation, the bundled ACK/NACK feedback comprises ACK/NACK feedback values determined for first and second component carriers, wherein the ACK/NACK feedback for the first component carrier is mapped to a first bit value associated with the one or more SR resources and the ACK/NACK feedback for the second component carrier is mapped to a second bit value associated with the one or more SR resources, and wherein in the TDD mode of operation, the bundled ACK/NACK feedback comprises a number of ACK instances for data transmissions on first and second TDD component carriers mapped to first and second bit values associated with the one or more SR resources; and code for determining the user equipment retransmission requests for downlink data on the plurality of component carriers in accordance with the received ACK/NACK feedback.

48. The computer program product of claim 47, wherein the code for determining the user equipment retransmission requests comprises:

code for mapping information received on the one or more SR resources to positive acknowledgment (ACK) and/or negative acknowledgement (NACK) feedbacks associated with downlink data of the user equipment.

49. The computer program product of claim 47, wherein the code for determining the user equipment retransmission requests comprises:

code for mapping a first bit value associated with the one or more SR resources to a first number of ACKs on a first subset of the plurality of component carriers;

code for determining the user equipment retransmission requests for downlink data on the first subset of the plurality of component carriers in accordance with the first number of ACKs;

code for mapping a second bit value associated with the one or more SR resources to a second number of ACKs on a second subset of the plurality of component carriers; and code for determining the user equipment retransmission requests for downlink data on the second subset of the plurality of component carriers in accordance with the second number of ACKs.

50. The computer program product of claim 49, wherein the first number of ACKs correspond to ACKs on a first component carrier, and the second number of ACKs correspond to ACKS on a second component carrier.

51. A wireless communication apparatus, comprising:

a scheduling request (SR) module configured to allocate one or more SR resources to a user equipment configured to operate in a wireless communication system with a plurality of component carriers; and an acknowledgment/negative acknowledgement (ACK/NACK) feedback module configured to receive bundled ACK/NACK feedback on the one or more SR resources allocated to the user equipment, wherein the bundled ACK/NACK feedback is mapped onto the one or more selected SR resources in a manner based on whether the wireless communication is according to a time-division duplex (TDD) or frequency-division duplex (FDD) mode of operation, wherein in the FDD mode of operation, the bundled ACK/NACK feedback comprises ACK/NACK feedback values determined for first and second component carriers, wherein the ACK/NACK feedback for the first component carrier is mapped to a first bit value associated with the one or more SR resources and the ACK/NACK feedback for the second component carrier is mapped to a second bit value associated with the one or more SR resources, and wherein in the TDD mode of operation, the bundled ACK/NACK feedback comprises a number of ACK instances for data transmissions on first and second TDD component carriers mapped to first and second bit values associated with the one or more SR resources, and to determine the user equipment retransmission requests for downlink data on the plurality of component carriers in accordance with the received ACK/NACK feedback, wherein at least one of the SR module or the ACK/NACK feedback module is implemented at least partially in hardware.

52. The apparatus of claim 51, wherein the ACK/NACK feedback module is further configured to map information received on the one or more SR resources to positive acknowledgment (ACK) and/or negative acknowledgement (NACK) feedbacks associated with downlink data of the user equipment.

53. The apparatus of claim 51, wherein the ACK/NACK feedback module is further configured to:

map a first bit value associated with the one or more SR resources to a first number of ACKs on a first subset of the plurality of component carriers;

determine the user equipment retransmission requests for downlink data on the first subset of the plurality of component carriers in accordance with the first number of ACKs;

map a second bit value associated with the one or more SR resources to a second number of ACKs on a second subset of the plurality of component carriers; and determine the user equipment retransmission requests for downlink data on the second subset of the plurality of component carriers in accordance with the second number of ACKs.

54. The apparatus of claim 53, wherein the first number of ACKs correspond to ACKs on a first component carrier, and the second number of ACKs correspond to ACKS on a second component carrier.

55. The method of claim 1, wherein a discontinuous transmission (DTX) scenario is mapped to a NACK.

56. The apparatus of claim 18, wherein a discontinuous transmission (DTX) scenario is mapped to a NACK.

57. The apparatus of claim 23, wherein a discontinuous transmission (DTX) scenario is mapped to a NACK.

58. The computer program product of claim 33, wherein a discontinuous transmission (DTX) scenario is mapped to a NACK.

59. The method of claim 38, wherein a discontinuous transmission (DTX) scenario is mapped to a NACK.

60. The apparatus of claim 43, wherein a discontinuous transmission (DTX) scenario is mapped to a NACK.

61. The apparatus of claim 47, wherein a discontinuous transmission (DTX) scenario is mapped to a NACK.

62. The computer program product of claim 51, wherein a discontinuous transmission (DTX) scenario is mapped to a NACK.

* * * * *